(12) United States Patent
Manolakos et al.

(10) Patent No.: US 11,419,089 B2
(45) Date of Patent: *Aug. 16, 2022

(54) SYSTEMS AND METHODS FOR BEAM GROUP REPORTING FOR NEW RADIO POSITIONING

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Sven Fischer, Nuremberg (DE); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,533

(22) Filed: Mar. 31, 2021

(65) Prior Publication Data

US 2021/0250893 A1 Aug. 12, 2021

Related U.S. Application Data

(63) Continuation of application No. 16/832,273, filed on Mar. 27, 2020, now Pat. No. 11,089,565.

(30) Foreign Application Priority Data

Apr. 30, 2019 (GR) .............................. 20190100186

(51) Int. Cl.
*H04W 24/10* (2009.01)
*H04W 64/00* (2009.01)
(Continued)

(52) U.S. Cl.
CPC ......... *H04W 64/003* (2013.01); *G01S 5/0236* (2013.01); *H04L 5/0051* (2013.01); *H04W 24/10* (2013.01); *G01S 1/20* (2013.01); *H04W 4/029* (2018.02)

(58) Field of Classification Search
CPC ... H04W 64/003; H04W 24/10; H04W 4/029; G01S 5/0236; G01S 1/20; H04L 5/0051
See application file for complete search history.

(56) References Cited

U.S. PATENT DOCUMENTS 9,482,742 B1* 11/2016 Fischer ................ G01S 5/0263
2017/0339516 A1* 11/2017 Edge ..................... H04W 48/12
(Continued)

FOREIGN PATENT DOCUMENTS

WO  WO-2020072171  4/2020

OTHER PUBLICATIONS

Ericsson: "Introducing Support for Multipath RSTD", 3GPP Draft, 3GPP TSG-RAN2 Meeting #96, R2-168381—Introducing Support for Multipath RSTD, 3rd Generation Partnership Project (3GPP), Mobile Competence Centre, 650, Route Des Lucioles, F-06921 Sophia-Antipolis Cedex, France, vol. RAN WG2, No. Reno, Nevada, Nov. 14, 2016-Nov. 18, 2016, Nov. 13, 2016 (Nov. 13, 2016), XP051177995, 4 pages, Retrieved from the Internet: URL: http://www.3gpp.org/ftp/Meetings_3GPP_SYNC/RAN2/Docs/. [retrieved on Nov. 13, 2016]* chapter 1-3.4 *.

(Continued)

*Primary Examiner* — Barry W Taylor
(74) *Attorney, Agent, or Firm* — Paradice and Li LLP

(57) ABSTRACT

This disclosure provides methods, devices, and systems for beam group reporting for positioning in new radio (NR) wireless communications systems. In some wireless communications systems, multiple PRS resources, e.g., a beam group, received by a user equipment (UE) from the same network entity may be used to produce a combined Time of (Continued)

Arrival (TOA) measurement for the reference or target to derive an Reference Signal Time Difference (RSTD) estimate. The UE provides to a network entity an indication of the PRS resources in the beam group, which may be specifically or generally identified. Additionally, parameters associated with the beam group are provided, such as a relative quality of the TOA measurement for each PRS resource in the subset, a spread of the TOA measurements in the subset, a relative signal strength of each PRS resource in the subset, or a spread of the signal strength in the subset.

30 Claims, 14 Drawing Sheets

(51) Int. Cl.
    *H04L 5/00*     (2006.01)
    *G01S 5/02*     (2010.01)
    *H04W 4/029*     (2018.01)
    *G01S 1/20*     (2006.01)

(56) References Cited

U.S. PATENT DOCUMENTS

| | | | |
|---|---|---|---|
| 2018/0054286 A1* | 2/2018 | Tang | H04B 7/0456 |
| 2020/0228381 A1 | 7/2020 | Manolakos et al. | |
| 2020/0351813 A1 | 11/2020 | Manolakos | |
| 2021/0006372 A1* | 1/2021 | Cha | H04L 5/0048 |
| 2021/0014644 A1* | 1/2021 | Wu | H04W 4/029 |

OTHER PUBLICATIONS

Ericsson: "Introducing Support for Multipath RSTD Reporting", 3GPP Draft, 3GPP TSG-RAN WG2 Meeting #96, 36355 CR0159 (REL-14) R2-168383—Multipath RSTD, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, Nov. 14, 2016-Nov. 18, 2016, Nov. 13, 2016 (Nov. 13, 2016), XP051177318, 12 pages, Retrieved from the Internet: URL: http://www.3gpp.org/ftp/Meetings_3GPP_SYNC/RAN2/Docs/. [retrieved on Nov. 13, 2016]* chapters 6.5.1.2, 6.5.1.5 *.

International Search Report and Written Opinion—PCT/US2020/025723—ISA/EPO—dated Jul. 3, 2020.

LG Electronics: "Discussion on Potential Enhancements for Indoor Positioning", 3GPP Draft, R1-150229 Discussion on potential enhancements for indoor positioning, 3rd Generation Partnership Project (3GPP), vol. RAN WG1, Athens, Greece; Feb. 8, 2015, pp. 1-4, XP050933443, retrieved from the Internet: URL: http://www.3gpp.org/ftp/Meetings_3GPP_SYNC/RAN1/Docs/.

Nokia, et al., "Measurement Requirements for Multipath RSTD Reporting", 3GPP Draft, 3GPP TSG RAN WG4 Meeting #81, R4-1609274, Measurement Requirements for Multipath RSTD Reporting, 3rd Generation Partnership Project (3GPP), Mobile Competence Centre, 650, Route Des Lucioles, F-06921 Sophia-Antipolis Cedex, France, vol. RAN WG4, No. Reno, USA, Nov. 14, 2016-Nov. 18, 2016, Nov. 4, 2016 (Nov. 4, 2016), XP051194475, 4 pages, Retrieved from the Internet: URL: http://www.3gpp.org/ftp/tsg_ran/WG4_Radio/TSGR4_81/Docs/. [retrieved on Nov. 4, 2016] * chapters 1-3 *.

3GPP TS 36.355, "3rd Generation Partnership Project, Technical Specification Group Radio Access Network, Evolved Universal Terrestrial Radio Access (E-UTRA), LTE Positioning Protocol (LPP) (Release 15)", 3GPP TS 36.355, V15.2.0, Dec. 2018, pp. 1-220.

LG Electronics: "Discussions on DL only based Positioning", R1-1900629, 3GPP TSG RAN WG1 Ad-Hoc Meeting 1901, Taipei, Taiwan, Jan. 21-25, 2019, 9 pages.

* cited by examiner

SYSTEMS AND METHODS FOR BEAM GROUP REPORTING FOR NEW RADIO POSITIONING

CROSS-REFERENCE TO RELATED APPLICATIONS

This application is a continuation of U.S. application Ser. No. 16/832,273, entitled "SYSTEMS AND METHODS FOR BEAM GROUP REPORTING FOR NEW RADIO POSITIONING," filed Mar. 27, 2020, which claims the benefit of Greek Patent Application No. 20190100186, entitled "SYSTEMS AND METHODS FOR BEAM GROUP REPORTING FOR NEW RADIO POSITIONING," filed Apr. 30, 2019, both of which are assigned to the assignee hereof and are expressly incorporated herein by reference in their entireties.

TECHNICAL FIELD

The following relates generally to wireless communications, and more specifically to techniques for supporting location services for user equipments (UEs) served by a Fifth Generation (5G) wireless network new radio (NR).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may determine a position or location of a supported UE using radio access network information. The information may be associated with UE-assisted positioning techniques, such as a reference signal transmission, by the base station and reporting of radio signaling measurements by the UE. These methods may support various location services (for example, navigation systems, emergency communications), and supplement one or more additional location systems supported by wireless communications devices (such as global positioning system (GPS) technology). As data traffic increases, however, other reporting of radio signaling measurements fail to provide robust signaling and communication within some environments, including in new radio (NR) systems. Improved techniques and systems are desired.

SUMMARY

This disclosure provides methods, devices, and systems for beam group reporting for positioning in new radio (NR) wireless communications systems. In some wireless communications systems, multiple PRS resources, e.g., a beam group, from the same network entity that are received by a user equipment (UE) may be used to produce a combined Time of Arrival (TOA) measurement for the network entity to be used as the reference or target for the derivation of Reference Signal Time Difference (RSTD) estimates. The UE may provide an indication of the PRS resources in the beam group to the network entity, along with parameters associated with the beam group. The PRS resources may be specifically identified or a more general indication may be provided. Associated parameters may include a relative quality of the TOA measurement for each PRS resource in the subset, a spread of the TOA measurements in the subset, a relative signal strength of each PRS resource in the subset, or a spread of the signal strength in the subset.

In one implementation, a method for wireless communication at a user equipment (UE) includes performing time of arrival (TOA) measurements for a plurality of positioning reference signal (PRS) resources in a PRS resource set received from a reference network entity, each PRS resource is associated with a beam transmitted by the reference network entity; choosing a first subset of PRS resources from the plurality of PRS resources transmitted from the reference network entity to be used as reference PRS resources for a Reference Signal Time Difference (RSTD) calculation between the reference network entity and a target network entity, wherein the first subset of PRS resources comprises more than one PRS resource; determining report parameters associated with the first subset of PRS resources, the report parameters comprising at least one of a relative quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and transmitting to a network entity an indication of the first subset of PRS resources and the report parameters associated with the first subset of PRS resources.

In one implementation, a user equipment (UE) configured for wireless communications, includes a wireless transceiver configured to communicate with base stations in a wireless network; at least one memory; and at least one processor coupled to the wireless transceiver and the at least one memory, the at least one processor configured to: perform time of arrival (TOA) measurements for a plurality of positioning reference signal (PRS) resources in a PRS resource set received from a reference network entity via the wireless transceiver, each PRS resource is associated with a beam transmitted by the reference network entity; choose a first subset of PRS resources from the plurality of PRS resources transmitted from the reference network entity to be used as reference PRS resources for a Reference Signal Time Difference (RSTD) calculation between the reference network entity and a target network entity, wherein the first subset of PRS resources comprises more than one PRS resource; determine report parameters associated with the first subset of PRS resources, the report parameters comprising at least one of a relative quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and transmit to a network entity, via the wireless transceiver, an indication of the first subset of PRS resources and the report parameters associated with the first subset of PRS resources.

In one implementation, a user equipment (UE) configured for wireless communications, includes a means for performing time of arrival (TOA) measurements for a plurality of positioning reference signal (PRS) resources in a PRS resource set received from a reference network entity, each PRS resource is associated with a beam transmitted by the reference network entity; a means for choosing a first subset of PRS resources from the plurality of PRS resources transmitted from the reference network entity to be used as reference PRS resources for a Reference Signal Time Difference (RSTD) calculation between the reference network entity and a target network entity, wherein the first subset of PRS resources comprises more than one PRS resource; a means for determining report parameters associated with the first subset of PRS resources, the report parameters comprising at least one of a relative quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and a means for transmitting to a network entity an indication of the first subset of PRS resources and the report parameters associated with the first subset of PRS resources.

In one implementation, a non-transitory computer readable medium comprising instructions, which when executed by one or more processors of a user equipment (UE) configured for wireless communications, configures the UE to: perform time of arrival (TOA) measurements for a plurality of positioning reference signal (PRS) resources in a PRS resource set received from a reference network entity, each PRS resource is associated with a beam transmitted by the reference network entity; choose a first subset of PRS resources from the plurality of PRS resources transmitted from the reference network entity to be used as reference PRS resources for a Reference Signal Time Difference (RSTD) calculation between the reference network entity and a target network entity, wherein the first subset of PRS resources comprises more than one PRS resource; determine report parameters associated with the first subset of PRS resources, the report parameters comprising at least one of a relative quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and transmit to a network entity an indication of the first subset of PRS resources and the report parameters associated with the first subset of PRS resources.

In one implementation, a method for wireless communication performed by a network entity may include transmitting a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; receiving from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and sending the indication of the subset of PRS resources and report parameters associated with the subset of PRS resources to a location server.

In one implementation, a network entity configured for wireless communications, includes an external interface configured to communicate with a user equipment (UE) and a location server in a wireless network; at least one memory; and at least one processor coupled to the wireless transceiver and the at least one memory, the at least one processor configured to: transmit, via the external interface, a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; receive, via the external interface, from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and send, via the external interface, the indication of the subset of PRS resources and report parameters associated with the subset of PRS resources to a location server.

In one implementation, a network entity configured for wireless communications, includes a means for transmitting a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; a means for receiving from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and a means for sending the indication of the subset of PRS resources and report parameters associated with the subset of PRS resources to a location server.

In one implementation, a non-transitory computer readable medium comprising instructions, which when executed by one or more processors of a network entity configured for wireless communications, configures the network entity to: transmit a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; receive from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and send the indication of the subset of PRS resources and report parameters associated with the subset of PRS resources to a location server.

BRIEF DESCRIPTION OF THE DRAWINGS

FIG. 9 is a diagram illustrating a PRS resource set and reporting of the selected PRS resources when repetition is ON.

DETAILED DESCRIPTION

In location determination, such as Observed Time Difference of Arrival (OTDOA) based positioning, the UE may measure time differences in received signals from a plurality of base stations. Because positions of the base stations are known, the observed time differences may be used to calculate the location of the terminal. In OTDOA, the mobile station measures the time of arrival (TOA) of signals from a reference cell (e.g., the serving cell) and one or more neighboring cells. The TOA from the reference cell may be subtracted from the TOA from the one or more reference cells to determine the Reference Signal Time Difference (RSTD). Using the RSTD measurements, the absolute or relative transmission timing of each cell, and the known position(s) of the physical transmitting antennas for the reference and neighboring cells, the UE's position may be calculated.

Positioning Reference Signals (PRS) are broadcast by base stations and are used by UEs for positioning in wireless networks, such as a Long Term Evolution (LTE) network, and 5G NR networks, where the UE measures the TOA (Time of Arrival) metric of different cells and reports to the network/server. A PRS transmission may include a plurality of PRS resources in a PRS resource set, where each PRS resource is associated with a beam transmitted by the base station. The UE may choose to use a subset of the PRS resource set as a reference PRS resource or a neighbor (target) resource, where the subset may be more than one PRS resource. For example, the UE may choose to use a subset of PRS resources from a reference base station to produce a reference TOA for the RSTD measurement, e.g., the subset of PRS resources are used to produce a combined TOA for the reference base station. Similarly, the UE may choose to a subset of PRS resources from a neighbor (target) base station to produce a neighbor TOA for the RSTD measurement, e.g., the subset of PRS resources are used to produce a combined TOA for the neighbor base station.

When more than one PRS resource, e.g., a beam group, is selected to be used as a reference resource or as a target resource, the UE may provide a beam group report that indicates the selected PRS resources. The selected PRS resources may be specifically identified or another indication may be provided, such as the number of PRS resources or a predefined subset identifier may be used. Additionally, one or more parameters of the subset of PRS resources may be provided. For example, the relative quality of the TOA measurement for each PRS resource in the subset or a spread of the TOA measurements for the subset of PRS resources may be provided. Other examples of possible parameters include, e.g., a relative signal strength of each PRS resource or a spread of the signal strength in the subset.

Figure 1:
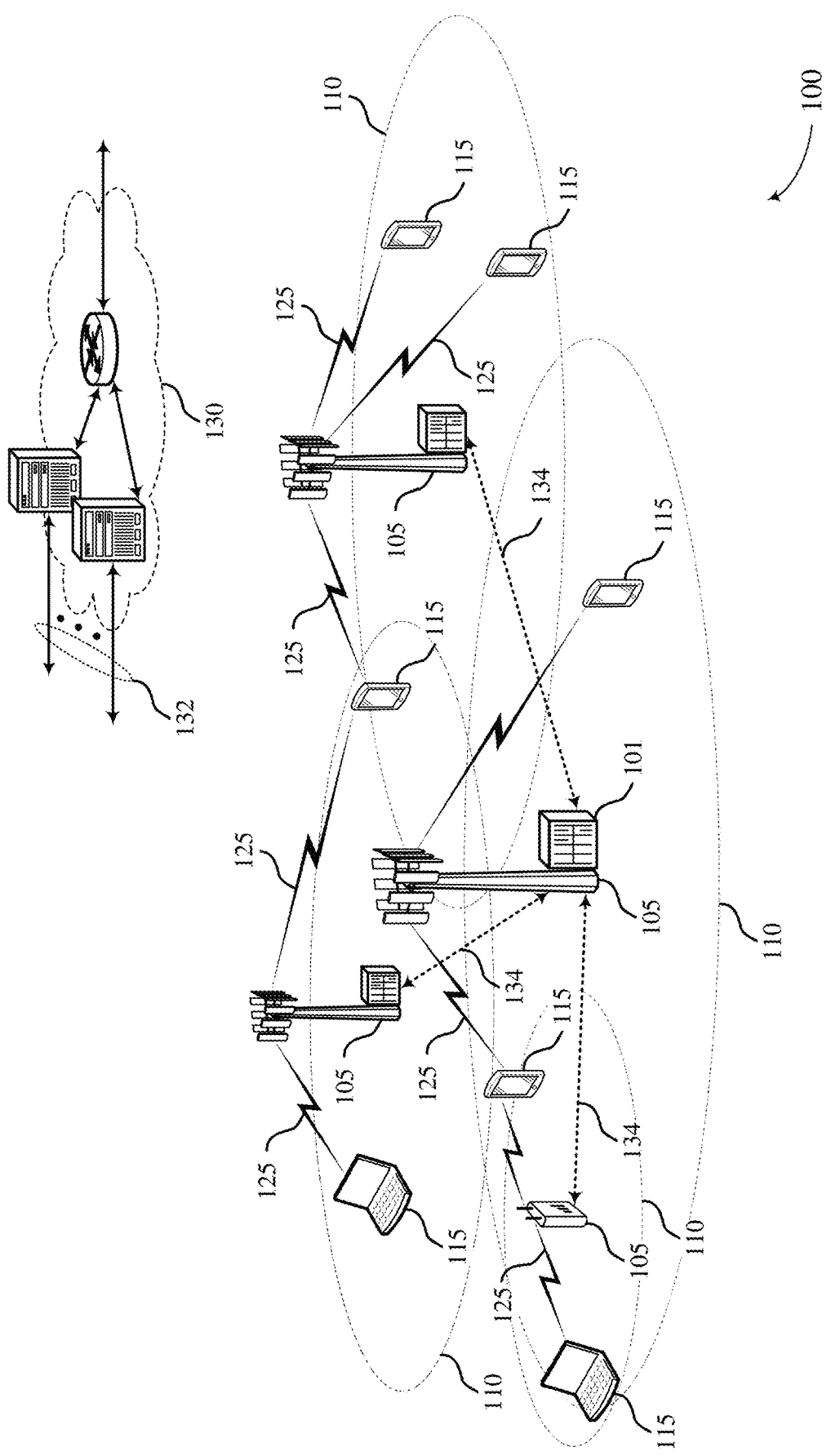
FIG. 1 illustrates an example of a wireless communications system that supports beam group reporting for positioning in new radio (NR) systems in accordance with aspects of the present disclosure.

FIG. 1 illustrates an example of a wireless communications system 100 in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling duration of $T_s = 1/30,720,000$ seconds. Time intervals of a communications resource may be organized according to radio frames each having a duration of 10 milliseconds (ms), where the frame duration may be expressed as $T_f = 307,200 \ T_s$. The radio frames may be identified by a system frame number (SFN) ranging from 0 to 1023. Each frame may include 10 subframes numbered from 0 to 9, and each subframe may have a duration of 1 ms.

A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol duration may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

As described herein, wireless communications system 100 may be an NR system and support communications between the one or more base stations 105 and supported UEs 115 using communication links 125. The UEs 115 may be dispersed throughout the wireless communications system 100, and each UE 115 may be stationary or mobile. Wireless communications system 100 may minimize always-on transmission and support forward capability, including transmission of reference signals based on a need at a base station 105 or a UE 115. As part of the communication, each of the base stations 105 and UEs 115 may support reference signal transmission for operations, including channel estimation, beam management and scheduling, and wireless device positioning within the one or more coverage areas 110.

For example, the base stations 105 may transmit one or more downlink reference signals for NR communications, including channel state information reference signal (CSI-RS) transmission. Each of the CSI-RS transmissions may be configured for a specific UE 115 to estimate the channel and report channel quality information. The reported channel quality information may be used for scheduling or link adaptation at the base stations 105, or as part of a mobility or beam management procedure for directional transmission associated with the enhanced channel resources.

A base station 105 may configure a CSI-RS transmission on one or more CSI-RS resources of the channel A CSI-RS resource may start at any OFDM symbol of a slot and occupy one or more symbols depending on a configured number of ports. For example, a CSI-RS resource may span one symbol of a slot and contain one port for transmission. The one or more CSI-RS resources may span a number of CSI-RS resource sets configured according to a CSI-RS resource setting of the base station 105. The structure of the one or more CSI-RS resources, CSI-RS resource sets, and CSI-RS resource settings within a CSI-RS transmission may be referred to as a multi-level resource setting. For example, a multi-level CSI-RS resource setting of the base station 105 may include up to 16 CSI-RS resource sets and each CSI-RS resource set may contain up to 64 CSI-RS resources. In some examples, the base station 105 may support a configured number of distinct CSI-RS resources (for example, 128) over one or more CSI-RS resource sets.

In some examples, a base station 105 may provide an indication (such as the tag "Repetition=ON") associated with a CSI-RS transmission directed to a UE 115. The indication may define whether the UE 115 may assume the included CSI-RS resources within the reference signal (for example, a non-zero power (NZP) CSI-RS transmission) are associated with the same downlink spatial domain transmission filter and correspond to a single transmit beam at the base station 105. The indication may be configured according to a higher layer signaling parameter (for example, reportQuantity) associated with all the reporting settings linked with the CSI-RS resource set. For example, the base station 105 may configure the reportQuantity parameter to a set indication (for example "cri-RSRP", "none", etc.) that indicates a single transmit beam.

At reception, the UE 115 may identify the configured set indication associated with the received higher layer signaling parameter. In some examples (such as "cri-RSRP" reporting), the UE 115 may determine CSI parameters for the one or more CSI-RS resources and report the measurements according to a refined reporting configuration. For example, the UE 115 may determine CSI parameters (for example, RSRP values) for the one or more channel resources. The UE 115 may then condition the reporting according to a configured channel resource indicator (CRI) value, as one example, where the CRI value corresponds to an index of a resource entry associated with the one or more CSI-RS resources in a corresponding CSI-RS resource set for channel measurement.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx–Tx), a signal-to-noise ratio (SNR), or a reference signal receive quality (RSRQ).

Wireless communications system 100 may be or include a multicarrier beamformed communication system, such as a mmW wireless communication system. Aspects of wireless communications system 100 may include use of PRS transmissions by the base station 105 or sounding reference signal (SRS) transmissions by the UE 115 for UE location determination. For downlink-based UE location determination, a location server 101, e.g., a Location Management Function (LMF) in a NR network or a Secure User Plane Location (SUPL) Location Platform (SLP) in LTE, may be used to provide positioning assistance, such as PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques. The location server 101 is illustrated in FIG. 1 as being located at a base station 105, but may be located elsewhere, e.g., within the core network 130.

For uplink-based UE location determination, the base station 105 may receive SRS transmissions from the UE 115 and determine position measurements, such as TOA or Rx–Tx. A location server 101 may receive measurement reports from one or more base stations 105 with the position measurements and may determine a position estimate for the UE 115, e.g., using OTDOA or other desired techniques.

Additionally, RAT independent techniques may be used to estimate a position of the UE 115. For example, the communications system 100 may further utilize information from space vehicles (SVs) (not illustrated) for a Global Navigation Satellite System (GNSS) like GPS, GLONASS, Galileo or Beidou or some other local or regional Satellite Positioning System (SPS) such as IRNSS, EGNOS or WAAS. Location related measurements obtained by UE 115 may include measurements of signals received from the SVs and/or may include measurements of signals received from terrestrial transmitters fixed at known locations (e.g., such as base stations 105). The UE 115 or location server 101 to which UE 115 may send the measurements, may then obtain a location estimate for the UE 115 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 115 relative to three or more terrestrial transmitters (e.g. base stations 105) fixed at known locations or relative to four or more SVs with accurately known orbital data, or combinations thereof, based at least in part, on pilots, positioning reference signals (PRS) or other positioning related signals transmitted by the transmitters or satellites and received at the UE 115.

Figure 2:
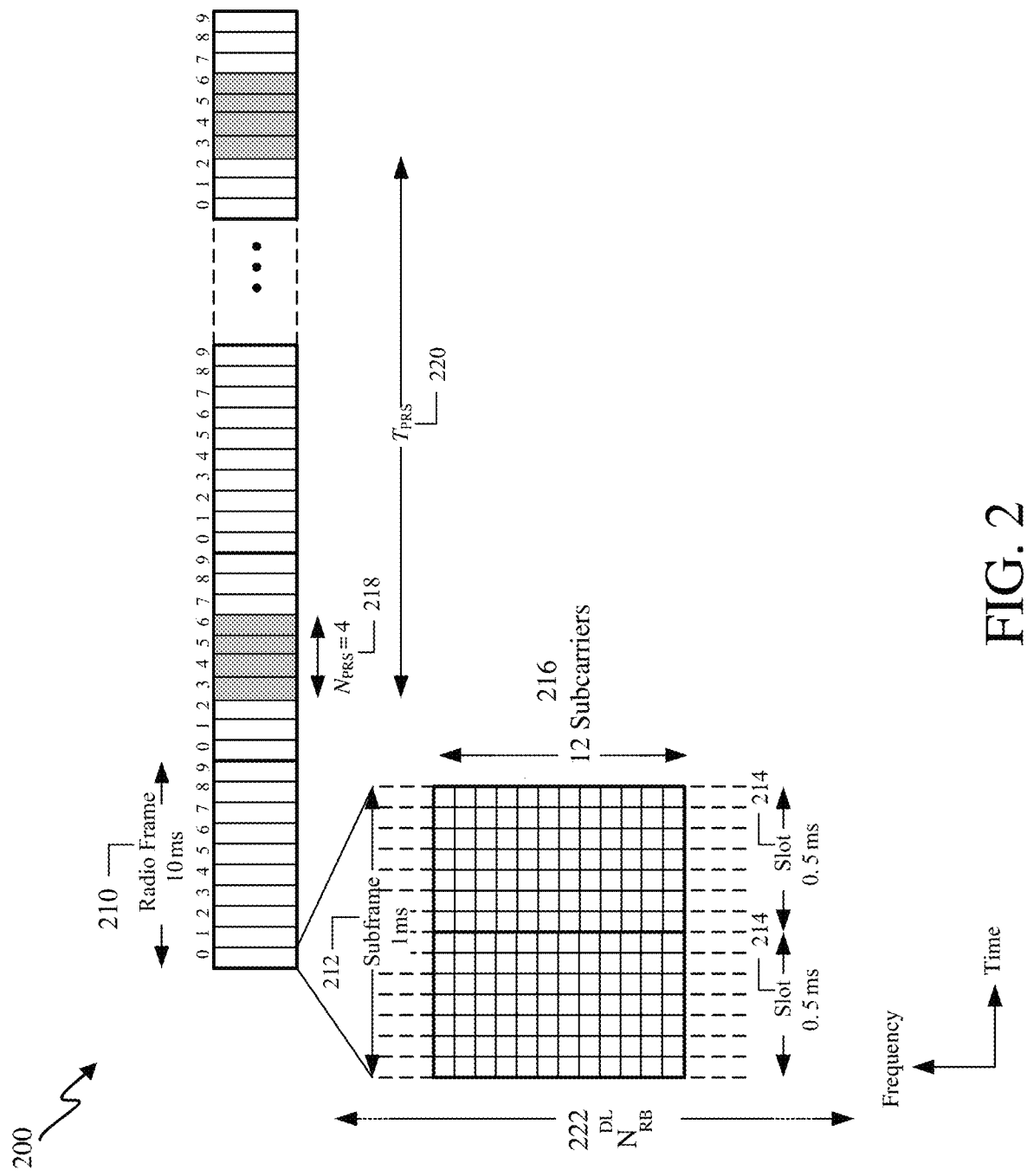
FIG. 2 is a diagram of a structure of an example LTE subframe sequence with Positioning Reference Signaling (PRS) positioning occasions.

FIG. 2 shows a structure of an example subframe sequence 200 with PRS positioning occasions. Subframe sequence 200 may be applicable to broadcast of PRS signals from base stations 105 in communication systems 100. While FIG. 2 provides an example of a subframe sequence for LTE, similar subframe sequence implementations may be realized for other communication technologies/protocols, such as 5G and NR. In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink Radio Frames 210 may be of 10 ms duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

In the communication system 100 illustrated in FIG. 1, a base station 105, such as macro cell base station or any of small cell base stations, may transmit frames, or other physical layer signaling sequences, supporting PRS signals (i.e. a downlink (DL) PRS) according to frame configurations either similar to, or the same as that, shown in FIG. 2 and (as described later) in FIG. 3, which may be measured and used for UE (e.g., UE 115) position determination. As noted, other types of wireless nodes and base stations (e.g., a gNB or WiFi AP) may also be configured to transmit PRS signals configured in a manner similar to (or the same as) that depicted in FIGS. 2 and 3. Since transmission of a PRS by a wireless node or base station is directed to all UEs within radio range, a wireless node or base station can also be considered to transmit (or broadcast) a PRS.

A PRS, which has been defined in 3GPP LTE Release-9 and later releases, may be transmitted by wireless nodes (e.g., base stations 105) after appropriate configuration (e.g., by an Operations and Maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2 illustrates a periodicity of positioning occasions where $N_{PRS}$ equals 4 218 and $T_{PRS}$ is greater than or equal to 20 220. In some aspects, $T_{PRS}$ may be measured in terms of the number of subframes between the start of consecutive positioning occasions.

As discussed herein, in some aspects, OTDOA assistance data may be provided to a UE 115 by a location server, e.g., location server 101 for a "reference cell", sometimes referred to herein as a reference resource, and one or more "neighbor cells" or "neighboring cells", sometimes referred to herein as a target cell or target resource, relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to OTDOA or some other position method.

PRS-based positioning by a UE 115 may be facilitated by indicating the serving cell for the UE 115 in the OTDOA assistance data (e.g., with the reference cell indicated as being the serving cell).

In some aspects, OTDOA assistance data may also include "expected RSTD" parameters, which provide the UE 115 with information about the RSTD values the UE 115 is expected to measure at its current location between the reference cell and each neighbor cell, together with an uncertainty of the expected RSTD parameter. The expected RSTD, together with the associated uncertainty, may define a search window for the UE 115 within which the UE 115 is expected to measure the RSTD value. OTDOA assistance information may also include PRS configuration information parameters, which allow a UE 115 to determine when a PRS positioning occasion occurs on signals received from various neighbor cells relative to PRS positioning occasions for the reference cell, and to determine the PRS sequence transmitted from various cells in order to measure a signal Time of Arrival (ToA) or RSTD.

Using the RSTD measurements, the known absolute or relative transmission timing of each cell, and the known position(s) of wireless node physical transmitting antennas for the reference and neighboring cells, the UE 115's position may be calculated (e.g., by the UE 115 or by the location server 101). More particularly, the RSTD for a neighbor (sometimes referred to as a target) cell "k" relative to a reference cell "Ref," may be given as $(ToA_k - ToA_{Ref})$, where the ToA values may be measured modulo one subframe duration (1 ms) to remove the effects of measuring different subframes at different times. ToA measurements for different cells may then be converted to RSTD measurements (e.g., as defined in 3GPP TS 36.214 entitled "Physical layer; Measurements") and sent to the location server 101 by the UE 115. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 115's position may be determined.

Figure 3:
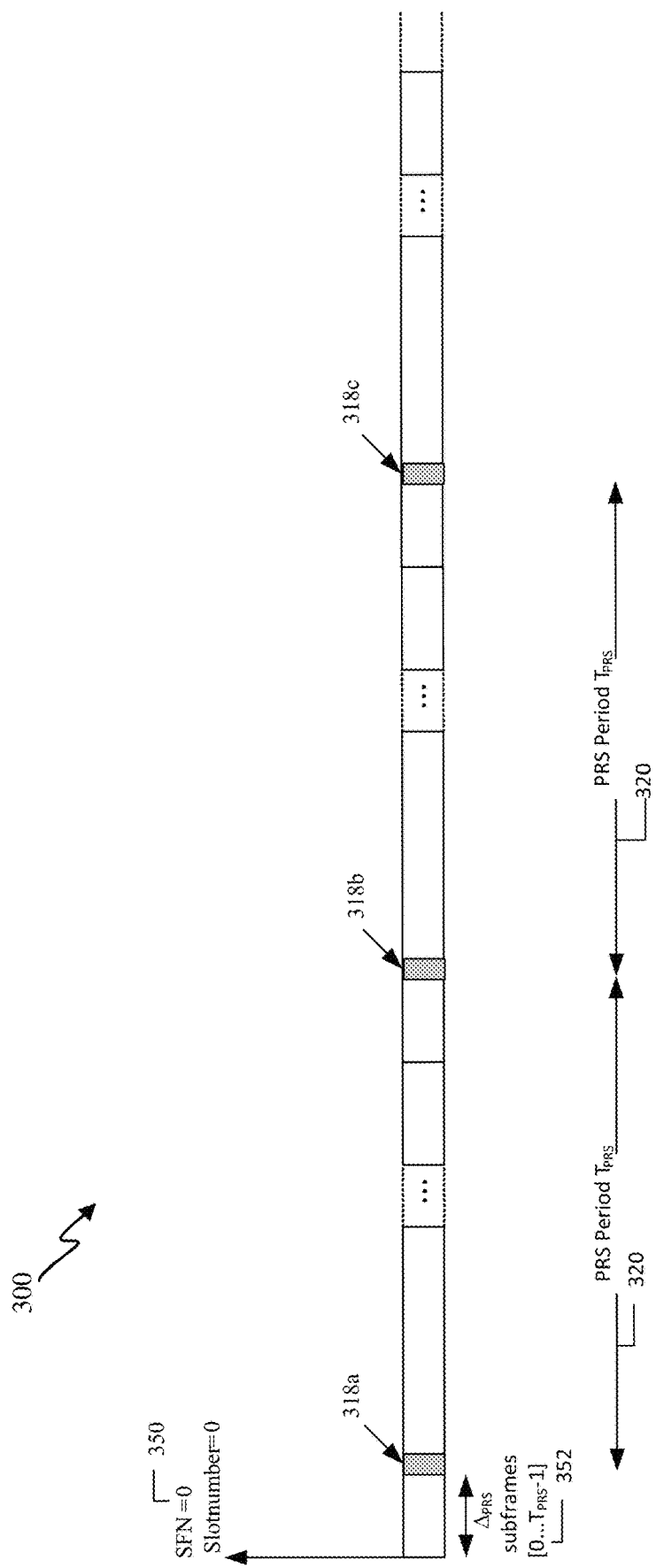
FIGS. 3 and 4 are diagrams illustrating further aspects of PRS transmission for a cell supported by a wireless node.

FIG. 3 illustrates an exemplary PRS configuration 300 for a cell supported by a wireless node (such as a base station 105). Again, PRS transmission for LTE is assumed in FIG. 3, although the same or similar aspects of PRS transmission to those shown in and described for FIG. 3 may apply to 5G, NR, and/or other wireless technologies. FIG. 3 shows how PRS positioning occasions are determined by a System Frame Number (SFN), a cell specific subframe offset ($\Delta_{PRS}$) 352, and the PRS Periodicity ($T_{PRS}$) 320. Typically, the cell specific PRS subframe configuration is defined by a "PRS Configuration Index" $I_{PRS}$ included in the OTDOA assistance data. The PRS Periodicity ($T_{PRS}$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \le n_f \le 1023$, $n_s$ is the slot number within the radio frame defined by $n_f$ with $0 \le n_s \le 19$, $T_{PRS}$ is the PRS periodicity 320, and $\Delta_{PRS}$ is the cell-specific subframe offset 352.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

In some aspects, when a UE 115 receives a PRS configuration index $I_{PRS}$ in the OTDOA assistance data for a particular cell, the UE 115 may determine the PRS periodicity $T_{PRS}$ 320 and PRS subframe offset $\Delta_{PRS}$ using Table 1. The UE 115 may then determine the radio frame, subframe and slot when a PRS is scheduled in the cell (e.g., using equation (1)). The OTDOA assistance data may be determined by, for example, the location server 101, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations 105) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 115 may determine the timing of the PRS occasions of the reference and neighbor cells for OTDOA positioning, if the UE 115 can obtain the cell timing (e.g., SFN or Frame Number) of at least one of the cells, e.g., the reference cell or a serving cell. The timing of the other cells may then be derived by the UE 115 based, for example, on the assumption that PRS occasions from different cells overlap.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355. A directional PRS may be configured as just described according to 3GPP TSs and may, for example, use a low PRS duty cycle (e.g., $N_{PRS}=1$, $T_{PRS}=160$ subframes) or a high duty cycle.

Figure 4:
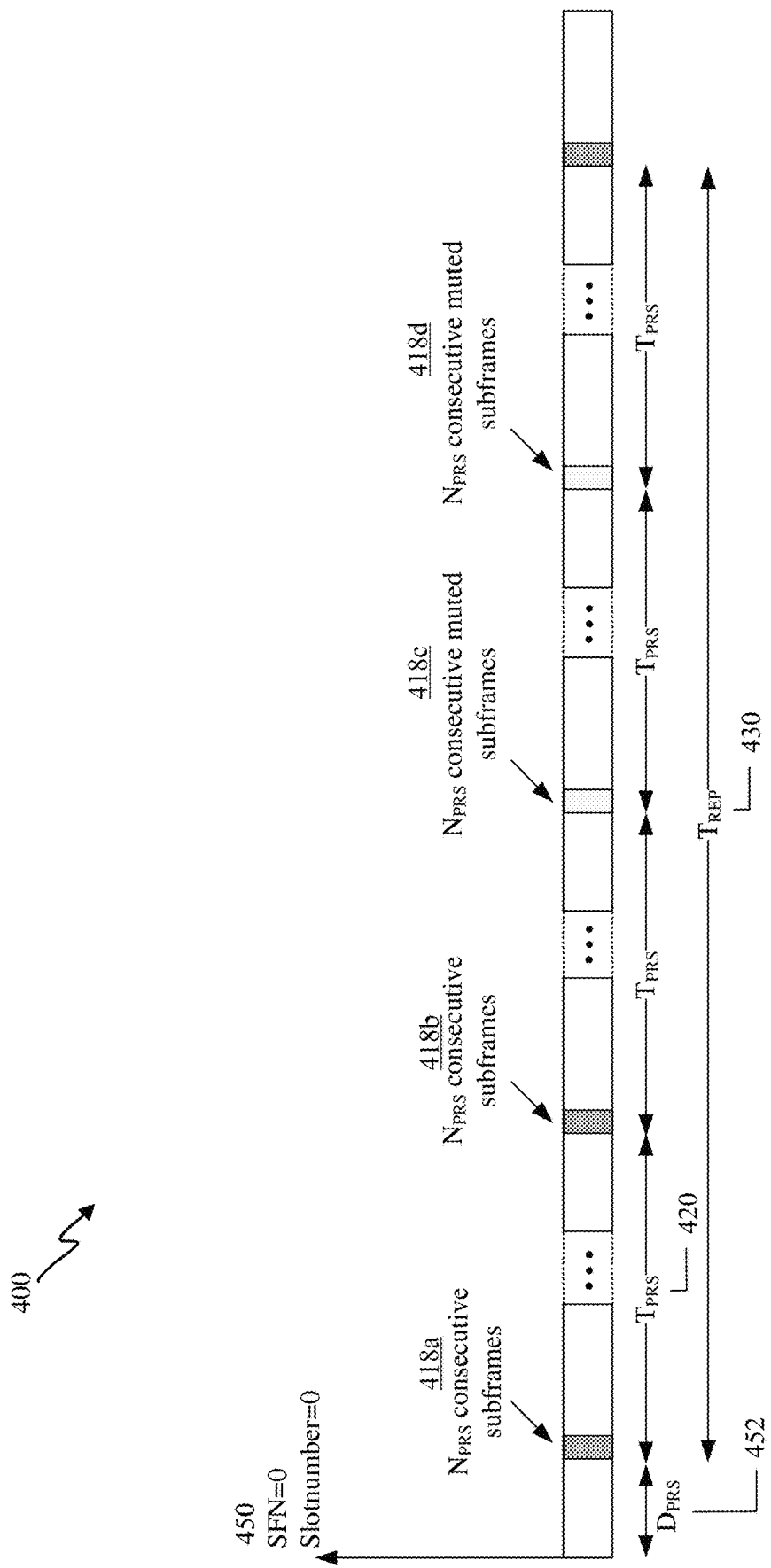

FIG. 4 illustrates an exemplary PRS configuration 400 in LTE that includes a PRS muting sequence. Like FIG. 3, FIG. 4 shows how PRS positioning occasions are determined by an SFN, a cell specific subframe offset ($\Delta_{PRS}$) 452, and the PRS Periodicity ($T_{PRS}$) 420. As shown in FIG. 4, the cell specific subframe offset $\Delta_{PRS}$ 452 may be defined in terms of the number of subframes transmitted starting from System Frame Number 0 (Slot 'Number 0', marked as slot 450) to the start of the first (subsequent) PRS positioning occasion. In the example in FIG. 4, the number of consecutive positioning subframes ($N_{PRS}$) in each of the consecutive PRS positioning occasions 418a and 418b equals 4.

Within each positioning occasion, PRS are generally transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and ToA and RSTD measurement, by UEs (such as the UE 115), of PRS signals that are not muted (by avoiding interference from PRS signals that have been muted). For example, when the (strong) PRS signal the UE 115 receives from one base station 105 is muted, the (weak) PRS signals from a neighboring base station 105 can be more easily detected by the UE 115. Muting may be viewed as the non-transmission of a PRS for a given positioning occasion for a particular cell. Muting patterns (also referred to as muting sequences) may be signaled to a UE 115 using bit strings. For example, in a bit string signaled to indicate a muting pattern, if a bit at position j is set to '0', then the UE 115 may infer that the PRS is muted for a $j^{th}$ positioning occasion.

With reference to FIG. 4, the muting sequence periodicity $T_{REP}$ 430 includes two consecutive PRS positioning occasions 418a and 418b followed by two consecutive muted PRS positioning occasions 418c and 418d. In LTE, the PRS muting configuration of a cell is only defined by a periodic muting sequence (e.g., muting sequence periodicity $T_{REP}$ 430), as opposed to an aperiodic or semi-persistent muting sequence. As such, the two consecutive PRS positioning occasions 418a and 418b followed by the two consecutive muted PRS positioning occasions 418c and 418d will repeat for the next muting sequence periodicity $T_{REP}$ 430.

To further improve hearability of PRS, positioning subframes may be low-interference subframes that are transmitted without user data channels. As a result, in ideally synchronized networks, PRS may receive interference from other cell's PRS with the same PRS pattern index (i.e., with the same frequency shift), but not from data transmissions. The frequency shift, in LTE, for example, is defined as a function of a PRS ID for a cell or other transmission point (TP) (denoted as $N_{ID}^{PRS}$) or as a function of a Physical Cell Identifier (PCI) (denoted as $N_{ID}^{cell}$) if no PRS ID is assigned, which results in an effective frequency re-use factor of 6.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration (e.g., PRS configuration 400/500), where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

Figure 5:
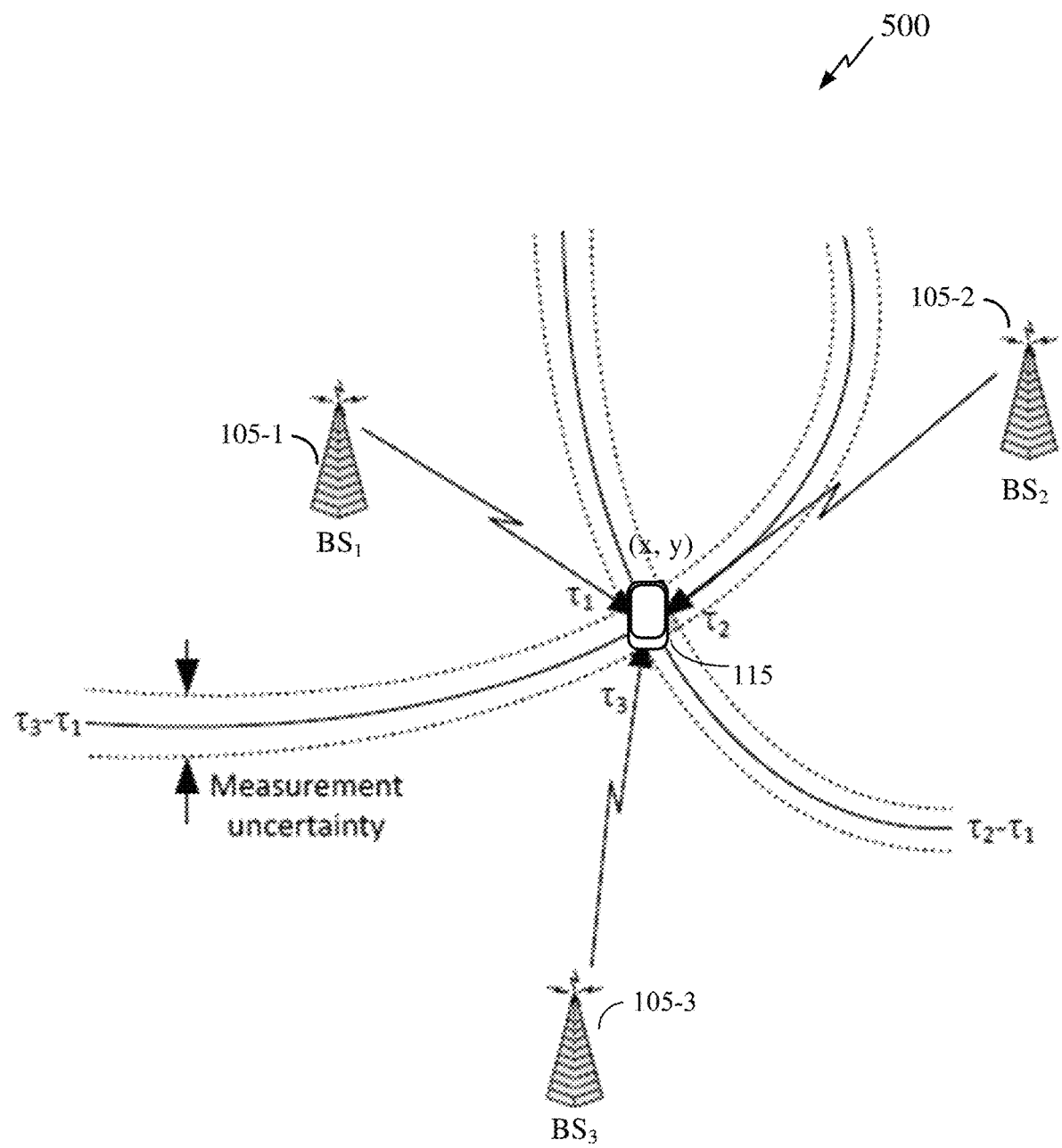
FIG. 5 is a diagram illustrating an exemplary technique for determining a position of a mobile device using information obtained from a plurality of base stations.

FIG. 5 illustrates an exemplary wireless communications system 500 according to various aspects of the disclosure. In the example of FIG. 5, a UE 115 is attempting to calculate an estimate of its position, or assist another entity (e.g., a base station or core network component, another UE, a location server, a third party application, etc.) to calculate an estimate of its position. The UE 115 may communicate wirelessly with a plurality of base stations 105-1, 105-2, and 105-3 (collectively, base stations 105), which may correspond to any combination of base stations 105 in FIG. 1, using RF signals and standardized protocols for the modulation of the RF signals and the exchange of information packets. By extracting different types of information from the exchanged RF signals, and utilizing the layout of the wireless communications system 500 (i.e., the base stations locations, geometry, etc.), the UE 115 may determine its position, or assist in the determination of its position, in a predefined reference coordinate system. In an aspect, the UE 115 may specify its position using a two-dimensional coordinate system; however, the aspects disclosed herein are not so limited, and may also be applicable to determining positions using a three-dimensional coordinate system, if the extra dimension is desired. Additionally, while FIG. 5 illustrates one UE 115 and three base stations 105, as will be appreciated, there may be more UEs 115 and more or fewer base stations 105.

To support position estimates, the base stations 105 may be configured to broadcast reference RF signals (e.g., PRS, CRS, CSI-RS, synchronization signals, etc.) to UEs 115 in their coverage area to enable a UE 115 to measure characteristics of such reference RF signals. For example, the UE 115 may use the OTDOA positioning method, and the UE 115 may measure the RSTD between specific reference RF signals (e.g., PRS, CRS, CSI-RS, etc.) transmitted by different pairs of network nodes (e.g., base stations 105, antennas of base stations 105, etc.).

Generally, RSTDs are measured between a reference network node (e.g., base station 105-1 in the example of FIG. 5) and one or more neighbor network nodes (e.g., base stations 105-2 and 105-3 in the example of FIG. 5). The reference network node remains the same for all RSTDs measured by the UE 115 for any single positioning use of OTDOA and would typically correspond to the serving cell for the UE 115 or another nearby cell with good signal strength at the UE 115. In an aspect, where a measured network node is a cell supported by a base station, the neighbor network nodes would normally be cells supported by base stations different from the base station for the reference cell and may have good or poor signal strength at the UE 115. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 170) may provide OTDOA assistance data to the UE 115 for the reference network node (e.g., base station 105-1 in the example of FIG. 5) and the neighbor network nodes (e.g., base stations 105-2 and 105-3 in the example of FIG. 5) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 115 as the reference network node.

In an aspect, while the location server (e.g., location server 101) may send the assistance data to the UE 115, alternatively, the assistance data can originate directly from the network nodes (e.g., base stations 105) themselves (e.g., in periodically broadcasted overhead messages, etc.). Alternatively, the UE 115 can detect neighbor network nodes itself without the use of assistance data.

In the example of FIG. 5, the measured time differences between the reference cell of base station 105-1 and the neighboring cells of base stations 105-2 and 105-3 are represented as $\tau_2-\tau_1$ and $\tau_3-\tau_1$, where $\tau_1$, $\tau_2$, and $\tau_3$ represent the transmission time of a reference RF signal from the transmitting antenna(s) of base station 105-1, 105-2, and 105-3, respectively, to the UE 115, and includes any measurement noise at the UE 115. The UE 115 may then convert the ToA measurements for different network nodes to RSTD measurements (e.g., as defined in 3GPP TS 36.214 entitled "Physical layer; Measurements") and (optionally) send them to the location server 101. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 115 position may be determined (either by the UE 115 or the location server 101).

The ToA $T_i$ at the UE 115 for the shortest path from base station i is $T_i=\tau_i+D_i/c$, where $D_i$ is the Euclidean distance between the base stations i with location ($q_i$) and the UE 115 with location (p), c is the speed of light in the air (299700 km/s), and $q_i$ is known through the cell information database. The Euclidean distance (i.e., the line distance between two points) is given by:

$$c(T_i-\tau_j)=\sqrt{2}R\sqrt{1-\sin(\varphi_1)\sin(\varphi_2)-\cos(\varphi_1)\cos(\varphi_2)\cos(\beta_1-\beta_2)},$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 115 first jointly processes all the resource elements (REs) on the channel on which that network node (e.g., base station 105) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 115 may chose a ToA estimate that is the earliest local maximum of the CER that is at least X dB higher than the median of the CER and a maximum Y dB lower than the main peak on the channel. The UE 115 determines the CER for each reference RF signal from each network node in order to determine the ToA of each reference RF signal from the different network nodes.

When the UE 115 obtains a location estimate itself using OTDOA measured time differences, the necessary additional data (e.g., network nodes' locations and relative transmission timing) may be provided to the UE 115 by a location server (e.g., location server 101). In some implementations, a location estimate for the UE 115 may be obtained (e.g., by the UE 115 itself or by the location server 101) from OTDOA measured time differences and from other measurements made by the UE 115 (e.g., measurements of signal timing from GPS or other GNSS satellites). In these implementations, known as hybrid positioning, the OTDOA measurements may contribute towards obtaining the UE's 115 location estimate but may not wholly determine the location estimate.

Uplink Time Difference of Arrival (UTDOA) is a similar positioning method to OTDOA, but is based on uplink reference RF signals transmitted by the UE (e.g., UE 115). Further, transmission and/or reception beamforming at the network node and/or UE 115 can enable wideband bandwidth at the cell edge for increased precision. Beam refinements may also leverage channel reciprocity procedures in 5G NR.

Figure 6:
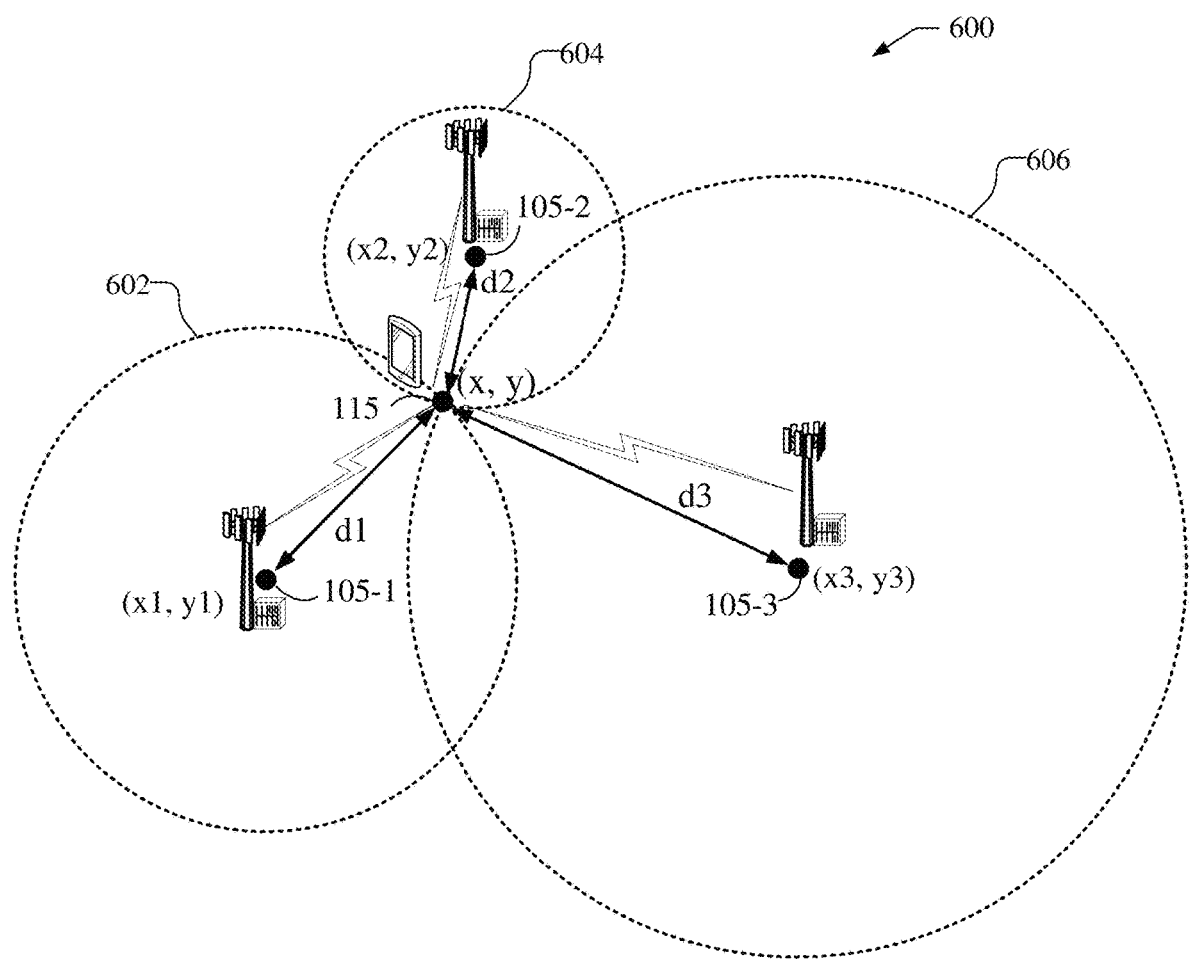
FIG. 6 is a diagram illustrating another exemplary technique for determining a position of a mobile device using information obtained from a plurality of base stations.

FIG. 6 illustrates a simplified environment and an exemplary technique for determining a position of a UE 115. The UE 115 may communicate wirelessly with a plurality of base stations (gNBs) 105-1, 105-2, 105-3 (sometimes collectively referred to as base stations 105) using radio frequency (RF)

signals and standardized protocols for the modulation of the RF signals and the exchanging of information packets. By extracting different types of information from the exchanged signals, and utilizing the layout of the network (i.e., the network geometry), the UE 115 may determine its position in a predefined reference coordinate system. As shown in FIG. 6, the UE 115 may specify its position (x, y) using a two-dimensional coordinate system; however, the aspects disclosed herein are not so limited, and may also be applicable to determining positions using a three-dimensional coordinate system, if the extra dimension is desired. Additionally, while three base stations are shown in FIG. 6, aspects may utilize additional gNBs.

In order to determine its position (x, y), the UE 115 may first need to determine the network geometry. The network geometry can include the positions of each of the base stations 105 in a reference coordinate system ((xk, yk), where k=1, 2, 3). The network geometry may be provided to the UE 115 in any manner, such as, for example, providing this information in beacon signals, providing the information using a dedicated server external on an external network, providing the information using uniform resource identifiers, etc.

The UE 115 may then determine a distance (dk, where k=1, 2, 3) to each of the base stations 105-k. As will be described in more detail below, there are a number of different approaches for estimating these distances (dk) by exploiting different characteristics of the RF signals exchanged between the UE 115 and base stations 105-1, 105-2, 105-3. Such characteristics may include, as will be discussed below, the round trip time (RTT) of the signals, and/or the strength of the signals (RSSI).

In other aspects, the distances (dk) may in part be determined or refined using other sources of information that are not associated with the base stations 105. For example, other positioning systems, such as GPS, may be used to provide a rough estimate of dk. (Note that it is likely that GPS may have insufficient signal strength in the anticipated operating environments (indoors, metropolitan, etc.) to provide a consistently accurate estimate of dk. However, GPS signals may be combined with other information to assist in the position determination process.) Other relative positioning devices may reside in the UE 115 which can be used as a basis to provide rough estimates of relative position and/or direction (e.g., on-board accelerometers).

Once each distance is determined, the UE 115 can then solve for its position (x, y) by using a variety of known geometric techniques, such as, for example, trilateration. From FIG. 6, it can be seen that the position of the UE 115 ideally lies at the common intersection of all of the circles 602, 604, and 606 drawn using dotted lines. Each circle being defined by radius dk and center (xk, yk), where k=1, 2, 3. In practice, the intersection of these circles may not lie at a single point due to the noise and other errors in the networking system.

Determining the distance between the UE 115 and each base station 105 may involve exploiting time information of the RF signals. In an aspect, determining the RTT of signals exchanged between the UE 115 and any base station can be performed and converted to a distance (dk). RTT techniques can measure the time between sending a signaling message and receiving a response. These methods may utilize calibration to remove any processing delays.

As used herein, a "network node" may be a base station (e.g., a base station 105), a cell of a base station (e.g., a cell of a base station 105), a remote radio head, an antenna of a base station (e.g., an antenna of a base station 105, where the locations of the antennas of a base station are distinct from the location of the base station itself), an array of antennas of a base station (e.g., an array of antennas of a base station 105, where the locations of the antenna arrays are distinct from the location of the base station itself), or any other network entity capable of transmitting reference RF signals. Further, as used herein, a "network node" may refer to either a network node or a UE.

The term "base station" may refer to a single physical transmission point or to multiple physical transmission points that may or may not be co-located. For example, where the term "base station" refers to a single physical transmission point, the physical transmission point may be an antenna of the base station (e.g., a base station 105) corresponding to a cell of the base station. Where the term "base station" refers to multiple co-located physical transmission points, the physical transmission points may be an array of antennas (e.g., as in a Multiple Input-Multiple Output (MIMO) system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 115) and a neighbor base station whose reference RF signals the UE 115 is measuring.

The term "cell" refers to a logical communication entity used for communication with a base station (e.g., over a carrier), and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

An "RF signal" comprises an electromagnetic wave that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

The term "position estimate" is used herein to refer to an estimate of a position for a UE 115, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Figure 7:
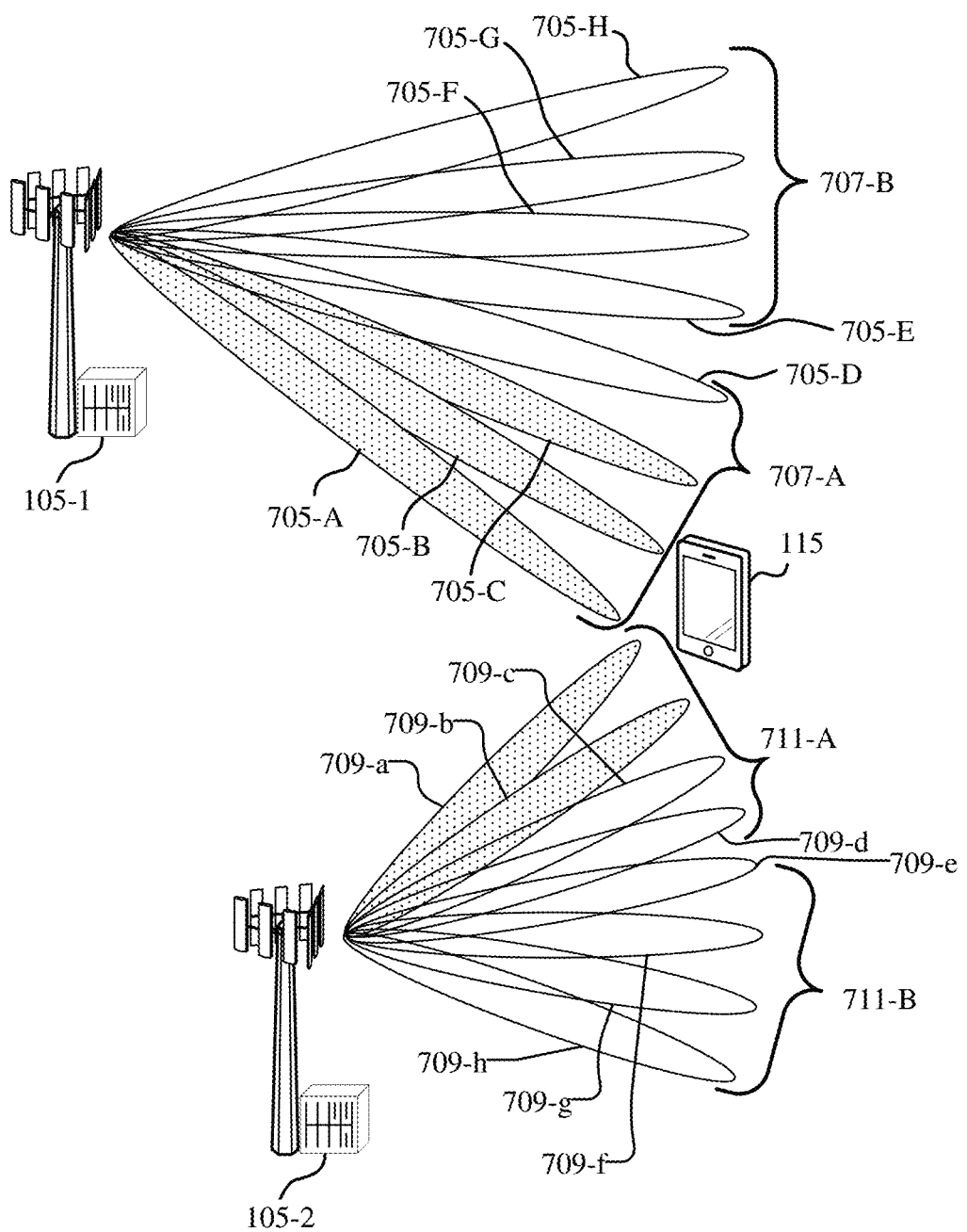
FIG. 7 is a diagram illustrating PRS transmissions as directional beams selection of beam groups for positioning in NR systems in accordance with aspects of the present disclosure.

FIG. 7, by way of example, illustrates a simplified environment 700 including two base stations 105-1 and 105-2, producing directional beams and a UE 115. Each of the directional beams is rotated, e.g., through 120 or 360 degrees, for each beam sweep, which is periodically repeated. Each direction beam is a PRS resource, where base station 105-1 produces a PRS resource set that includes PRS resources (or beams) 705-a, 705-b, 705-c, 705-d, 705-e, 705-f, 705-g, and 705-h, and the base station 105-2 produces a PRS resource set that includes PRS resources (or beams) 709-a, 709-b, 709-c, 709-d, 709-e, 709-f, 709-g, and 709-h.

The UE 115 may receive the PRS resources in a direct line of sight (LOS) connection or non-LOS connection (or near LOS connection). In a direct LOS connection, the UE 115 receives the PRS resource from the base station directly, whereas non-LOS and near LOS connections the UE 115 receives the PRS resource indirectly, e.g., after one or more reflections, which increases signal travel time, and/or blockage, which decreases signal strength. Some or all of the PRS resources in a PRS resource set from a base station may suffer from loss of LOS.

The base station 105-1 may serve as a reference base station and base station 105-2 may serve as a target (neighbor) base station in an RSTD measurement performed by the UE 115. The UE 115 may perform TOA measurements of each of the PRS resources received from reference base station 105-1 and may choose to use more than one PRS resource as a reference PRS resource from the reference base station 105-1. For example, as illustrated with shading in FIG. 1, PRS resources 705-a, 705-b, and 705-c, may be selected by the UE 115 as part of a subset of PRS resources to be used as reference PRS resources for a RSTD calculation. Similarly, the UE 115 may perform TOA measurements of each of the PRS resources received from target base station 105-2 and may choose to use more than one PRS resource as a reference PRS resource from the reference base station 105-2. For example, as illustrated with shading in FIG. 1, PRS resources 709-a and 709-b may be selected by the UE 115 as part of a subset of PRS resources to be used as target PRS resources for a RSTD calculation.

The UE 115 may choose particular PRS resources from a PRS resource to be used as the reference (target) PRS resources in the RSTD measurement in any desired manner. For example, the selection may be based on the measured TOA, the quality of the TOA measurements, e.g., uncertainty, signal strength (e.g., the reference signal receive power (RSRP)) or a combination thereof. For example, it may be desirable to use PRS resources with close TOA measurements, e.g., within a desired range, and similar quality of TOA measurement and signal strength.

The selected subset of PRS resources from the reference base station 105-1 may be combined in any desired manner to produce a reference TOA and the selected subset of PRS resources from the target (neighbor) base station 105-2 may be similarly combined to produce a target TOA, where the RSTD may be determined as the $TOA_{target} - TOA_{reference}$. For example, the TOAs from the selected PRS resources from the reference base station may be linearly averaged to produce the $TOA_{reference}$. A weighted average may be used, e.g., with the quality of the TOA measurement, e.g., estimated uncertainty, for each selected PRS resource serving as weights. The combined TOA measurements based on the selected PRS resources may be produced in other manners. The combined TOA may be produced by the UE 115 and provided to the location server 101, or used to produce a RSTD measurement which is provided to the location server 101.

Techniques are described herein for using a subset of a PRS resource set transmitted by a network entity, such a base station, as reference PRS resources or target PRS resources for a RSTD calculation between a reference network entity (e.g., base station) and a target network entity (e.g., base station), which may sometimes be referred to as a neighbor network entity. For example, an identification of the selected PRS resources as well as parameters associated with the selected PRS resources are provided to a network entity, such as location server 101, which may be used in a position determination of the UE 115.

A downlink (DL) PRS resource set is a set of PRS resources transmitted by the same base station, where each PRS resource may have a PRS resource identifier (ID), which is associated with a single beam transmitted by the base station. The network may provide information related to the PRS resource set to the UE 115 for the UE to use to determine a reference (or target) resource for RSTD measurements. For example, the network may provide one or more of a PRS resource ID, a subset of PRS resource IDs from a PRS resource set, and a PRS resource set. The UE 115 may use one or more of the provided PRS resources belonging to the PRS resource set or a different PRS Resource set for determining the reference (or target) resources to be used in the RSTD calculation. The UE 115 may report an identifier of the chosen PRS resources to be used as the reference (or target) network entity (e.g., base station) in the RSTD calculation. The identifier may be, e.g., the PRS Resource ID(s) and/or the information related to the PRS Resource set from which the PRS resources were chosen.

The UE 115 may use more than one PRS resource from a PRS resource set as reference resources and may use more than one PRS resource from a PRS resource set as target resources for the RSTD measurement. For example, referring to FIG. 7, the UE 115 may choose more than one PRS resource, e.g., PRS resources 705-a, 705-b, and 705c, as the subset of PRS resources to be used as the reference PRS resources from the reference network entity, e.g., base station 105-1, for an RSTD calculation between the reference network entity, e.g., base station 105-1, and the target network entity, e.g., base station 105-2. Similarly, the UE 115 may choose more than one PRS resource, e.g., PRS resources 709-a and 709-b, as the subset of PRS resources to be used as the target (neighbor) PRS resources from the target network entity, e.g., base station 105-2, for an RSTD determination between the reference network entity, e.g., base station 105-1, and the target network entity, e.g., base station 105-2. The UE 115 may report to a network entity, e.g., the location server 101, an indication of the first subset of PRS resources from the reference network entity PRS resource set that are to be used as the reference PRS resources for the RSTD measurement. Similarly, the UE 115 may report to the network entity, e.g., the location server 101, an indication of the second subset of PRS resources from the target network entity PRS resource set that are to be used as the target PRS resources for the RSTD measurement. The UE 115 may further determine and report one or more parameters associated with the one or more chosen subsets of PRS resources. It should be understood that if a selected subset of PRS resources includes only a single PRS resource, the UE 115 may not report parameters for the subset of PRS resources, as multiple PRS resources are not used to produce a combined TOA for the RSTD measurement.

An example of one report parameter that may be determined and reported is a relative quality of the TOA measurements of each PRS resource in the chosen subset of PRS resources. Thus, for example, if the UE 115 identifies PRS resources that have close TOA estimates, and are received with equal strength, they may be equally likely to be a good PRS resource reference (or target) and the UE 115. The UE 115 may accordingly choose to use both of these PRS resources as a reference (or target) PRS resource in an RSTD measurement. The UE 115 may provide an indication of the identity of these two PRS resources and may provide an indication of the relative quality of the TOA measurements from each PRS resource, e.g., a metric on how likely that these PRS resources are in the line of sight with the UE 115. For example, the relative quality of the TOA measurements may be a comparison of an estimated uncertainty value of each PRS resource, e.g., provided in time or distance units. The comparison of the estimated uncertainty may be to one the PRS resources in the subset of PRS resources, e.g., the PRS corresponding to the earliest TOA measurement. As an example, the UE 115 may include four PRS resources in the subset to be used as a reference for the derivation of the RSTD estimate, and may indicate that the TOA estimate of the 2nd PRS resource is estimated to be within 1 nsec (or 0.333 meters) away from the true TOA of the 2nd PRS resource, the 3rd PRS resource is estimated to be within 3 nsec (or 1 meter) from the true TOA of the 3rd PRS resource, and the 4th PRS resource is estimated to be within 0 nsec (or 0 meters) from the true TOA of the 4th PRS resource. As another example, the UE 115 may include four PRS resources in the subset to be used as a reference, and indicate that the TOA estimate of the 2nd PRS resource is up to 1 nsec (or up to 0.333 meters) away of the 1st PRS resource, the 3rd PRS resource is up to 3 nsec (or up to 1 meter) from the 1st PRS resource, and the 4th PRS resource is up to 0 nsec (or up to 0 meters) from the 1st PRS resource. The estimated uncertainty value of each PRS resource, for example, may serve as a weight for a linear average of the TOA measurements produced using the subset of PRS resources, where a sum of the weights across all the PRS resources in the subset of PRS resources is 1. For example, each PRS resource may be provided a weight, e.g., (w1, w2, w3, w4) for a four PRS resource subset, where w1+w2+w3+w4=1, and the reference TOA is determined as the weighted average of the TOAs estimated for each PRS resource. Thus, the individual TOAs for each PRS resources are not reported by the UE 115, but are combined into the reference TOA. Moreover, the combined reference TOA may not be reported by the UE 115, as the UE 115 may report the measured RSTD, which is determined using the combined reference TOA and a target TOA (which may be a combined TOA).

It should be noted that the relative quality of the TOA measurement of each PRS resource in the subset of PRS resources to be used as the reference PRS resources or the target PRS resources in an RSTD measurement is not the same as providing an RSTD quality on a TDOA measurement. The TDOA measurement is the difference between TOA measurements from a reference resource and a target resource, and thus, an RSTD quality is relative to that difference. The relative quality of the TOA measurements, described here, on the other hand, is for each of the plurality of PRS resources that is to be used as the reference resource in the RSTD measurement or each of the plurality of PRS resources that is to be used as the target resource in the RSTD measurement. In this example, each of the four PRS resources is provided a weight, e.g., (0.2, 0.4, 0.1, 0.3), and the reference TOA is the weighted average of the TOAs estimated for each PRS resource, but the individual TOAs are NOT reported. Moreover, the combined TOA may not be reported, since the UE 115 may simply report the RSTD (TOA_target−TOA_reference). An RSTD quality metric is a metric of the quality of TOA_target−TOA_reference and is not related to how the TOA_reference is composed or derived from the TOA estimates of the plurality of PRS resources that are used as the reference (or target).

In another example, a report parameter that may be determined and reported is the spread of the TOA measurements for the subset of PRS resources. For example, if the UE 115 reports the RSTD measurement with a granularity of X nsec, and the UE 115 receives a number of PRS resources, i.e., four beams from the same base station, within a time period much less than the granularity, e.g., Y<<X nsec, the UE 115 may choose to use the four PRS resources as the reference (or target) PRS resource for the RSTD measurement. The UE 115 may provide an indication of the four PRS resources as well as report the spread of their TOAs. In one example, the spread of the TOA measurements may be the range of TOA measurements or a range of the TOA measurements relative to one TOA measurement, e.g., relative to the shortest TOA measurement). In one example, the determination of the spread of the TOA measurements may use the quality measurement, e.g., estimated uncertainty values, for the PRS resources that are included in the subset of PRS resources. Continuing the above example of four PRS resources in the subset of PRS resources to be used as reference PRS resources, if the UE 115 reports the spread of the TOA measurements, the UE 115 does not report an individual value for each PRS resource, but reports one value, e.g., 3 nsec (or 1 meter), which is as a window within which all the TOAs of the PRS resources appear. The spread may be based on the TOA measurements, or both TOA and quality measurement. In the example at hand, because the weights are (0.2, 0.4, 0.1, 0.3) and the TOAs uncertainty is (0 nsec, 1 nsec, 3 nsec, 0 nsec), the spread may be computed at the UE 115 as follows: 0.2*0+0.4*1+0.1*3+0.3*0=0.7 nsec. Other methods of determining the spread of the TOA measurements may be used as well, but one number is provided for the subset of PRS resources in the units of time (e.g., nsec) or distance (e.g., meters).

In another example, a report parameter that may be determined and reported is the relative reference signal receive power (RSRP) for each PRS resource in the subset of PRS resources. For example, the power over the full bandwidth for each PRS resource maybe used. The relative RSRP for each PRS resource may be a comparison of the RSRP for each for each PRS resource in the subset of PRS resources relative to one PRS resource.

In another example, a report parameter that may be determined and reported is the spread of the RSRP of each PRS resource in the subset of PRS resources. For example, the spread of the RSRP may be across all PRS resources in the subset of PRS resources. In the example of the four PRS resources to be used as reference PRS resources, the RSRP for each PRS resource may be measured as, e.g., −100 dBM, −90 dBM, −110 dBM, and −100 dBm. In this example, the UE 115 may report the relative RSRPs as (0,−10,10,0) or the spread of RSRPs as (20 dBm).

The indication of the subset of PRS resources provided by the UE 115 may include the PRS resource IDs for each PRS resource in the subset of PRS resources. For example, in FIG. 7, the UE 115 may provide the PRS resource IDs associated with the PRS resources 705-a, 705-b, and 705c for the reference PRS resources, and the PRS resource IDs associated with the PRS resources 709-a and 709-b for the target PRS resources. To reduce overhead, however, instead of reporting the PRS resource IDs, the UE 115 may provide the number of PRS resources in the subset of PRS resources. For example, if a PRS resource set has 16 PRS resources, to report any potential subsets, the UE 115 would need to report a 16 bit number. In this example, by reporting the number of PRS resources, rather than their identifies, the UE would only need to report a 4 bit number (log 2(16)=4 bits). For example, in FIG. 7, the UE 115 may indicate that 3 PRS resources are included in the subset of PRS resources for the reference PRS resources and 2 PRS resources are included in the subset of PRS resources for the target PRS resources. The number of PRS resources may be provided as a field with N bits, where N is the number of PRS resources in the PRS resource set. Additionally, the UE may report an estimate of the spread of the TOAs of the PRS resources within the subset which are used as reference (or target) PRS resource, as discussed above.

Additionally, to reduce overhead in the reporting of the subset of PRS resources that are to be used as reference (or target) PRS resources, a subset index may be used. For example, the network may configure an index that identifies a plurality of different possible subsets of PRS resources in the PRS resource set. For example, in FIG. 7, the network, e.g., location server 101, may identify for the reference base station 105-1 a first predefined subset 707-a of PRS resources as including PRS resources 705-a, 705-b, 705-c, and 705-d, and may identify a second predefined subset 707-b of PRS resources as including PRS resources 705-e, 705-f, 705-g, and 705-h. Similarly, for the target base station 105-2, a first predefined subset 711-a of PRS resources may be identified as including PRS resources 709-a, 709-b, 709-c, and 709-d, and a second predefined subset 711-b of PRS resources may be identified as including PRS resources 709-e, 709-f, 709-g, and 709-h. The network, e.g., the location server 101, may provide the index to the UE 115, for example, in an RRC or LLP message, or a higher signaling layer. The UE 115 may identify the subset PRS resources using a subset index that includes one or more of the PRS resources chosen for the subset of PRS resources. For example, in FIG. 7, the UE 115 may indicate that the subset of PRS resources for the reference PRS resources is in predetermined subset 707-a and that the subset of PRS resources for the target PRS resources is in predetermined subset 711-a. The UE 115, for example, may transmit the subset index to the location server in a Physical Uplink Shared Channel (PUSCH) or Physical Uplink Control Channel (PUCCH), e.g., as a physical layer payload.

In another example, the indication of the subset of PRS resources provided by the UE 115 may not include the specific PRS resources in the subset of PRS resources, but may include an identifier for the PRS resource set. For example, when a PRS resource set is configured with Repetition ON, there is no benefit to reporting a subset of the PRS resource set, because the UE 115 picks the Rx beams transparently, and it will not assist the location server 101 to know PRS resources are used as the reference (target) PRS resource. It may be useful for the location server 101 to know which Tx beam is used as the reference (target) PRS resource. Thus, instead of identifying the PRS resources in the subset, the UE 115 may provide an identifier for the PRS resource set.

Figure 8:
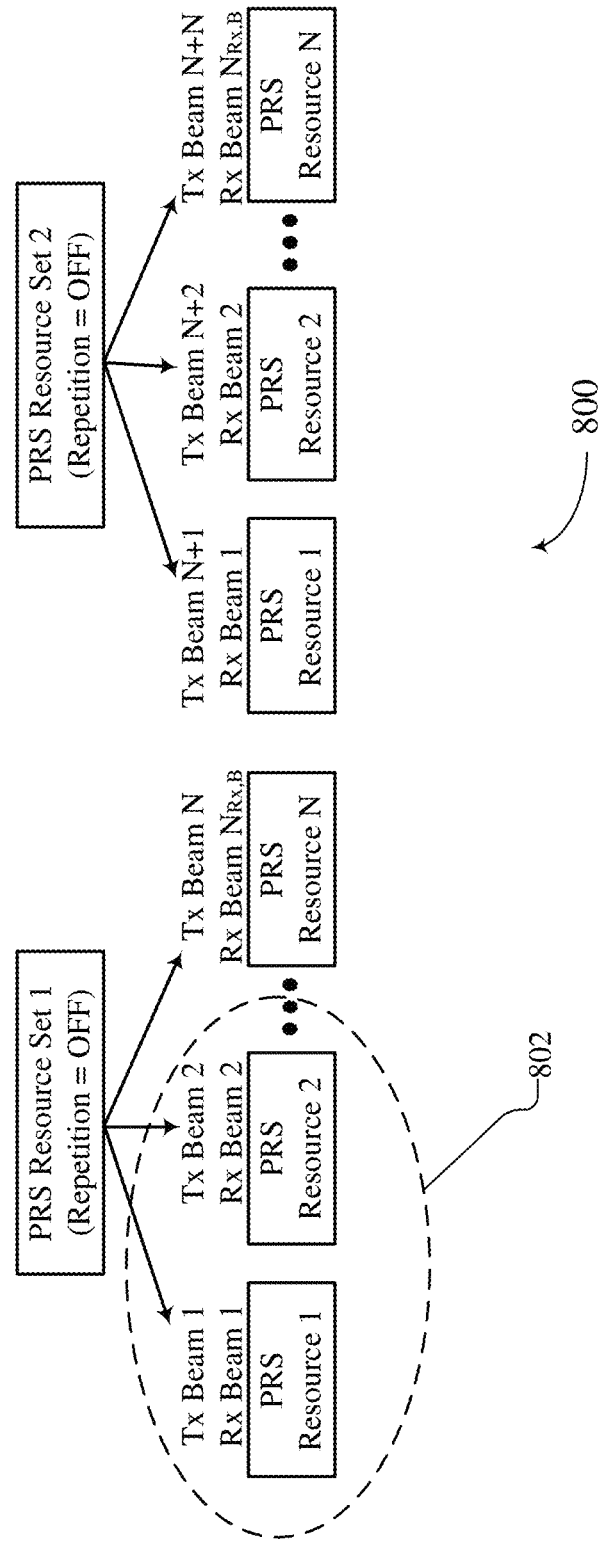
FIG. 8 is a diagram illustrating a PRS resource set and reporting of the selected PRS resources when repetition is OFF.

FIG. 8 illustrates an example of a PRS resource set 800 with repetition configuration. The PRS resource set 800 is illustrated as a PRS resource set 1, with repetition OFF, having Tx beam 1, Tx beam 2 to Tx beam N, and a PRS resource set 2, with repetition OFF having Tx beam N+1, Tx beam N+2 to Tx beam N+N. The PRS resource set 800 may include additional PRS resource sets. Each of the PRS resource sets may be associated with one or more receive beams (for example, Rx beam 1 up to Rx beam $N_{RX,B}$). Each Rx beam 1 includes a PRS resource, e.g., a port transmitted in a slot with periodicity configured and slot offset. A PRS resource is always associated with a Tx beam (downlink spatial domain transmission filter) and an Rx beam (downlink spatial domain reception filter). When repetition is OFF in a PRS resource set, the PRS resources within the PRS resource set may not be associated with the same downlink spatial domain transmission filter and may not correspond to a single transmit beam at the base station 105.

As illustrated by dotted lines 802, PRS resource 1 and PRS resource 2 may be selected by the UE 115 as a subset of PRS resources to be used as reference (or target) PRS resources for an RSTD measurement. The repetition of the PRS resource set is OFF. Accordingly, the UE 115 will provide an indication of the subset of PRS resources, e.g., by providing PRS resource identifiers, providing the number of PRS resources, or using a predefined subset index. The UE 115 will further provide report parameters associated with the subset of PRS resources, such as the a relative quality of the TOA measurement for each PRS resource in the subset, a spread of the TOA measurements for the subset of PRS resources, a relative RSRP for each PRS resource in the subset, a spread of the RSRP of each PRS resource in the subset, or a combination thereof.

Figure 9:
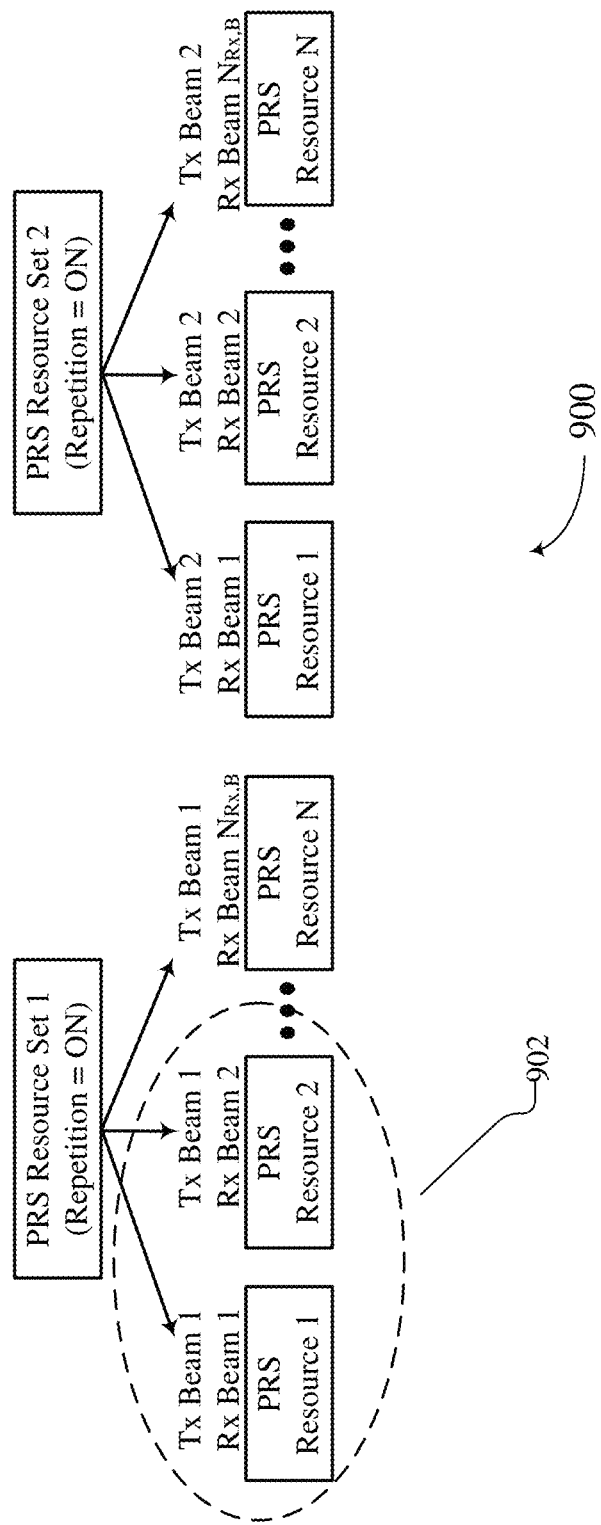

FIG. 9 illustrates another example of a PRS resource set 900 with repetition configuration. The PRS resource set 900 is similar to PRS resource set 800 shown in FIG. 8, but Tx beams in PRS resource set 900 have repetition ON. When repetition is ON, the UE 115 may assume the included PRS resources within each PRS resource set are associated with the same downlink spatial domain transmission filter and correspond to a single transmit beam at the base station 105. As illustrated by dotted lines 902, PRS resource 1 and PRS resource 2 may be selected by the UE 115 as a subset of PRS resources to be used as reference (or target) PRS resources for an RSTD measurement. The repetition of the PRS resource set is ON. Accordingly, the UE 115 may provide an indication of the subset of PRS resources, e.g., by providing an identifier for the PRS resource set 1, as opposed to PRS resource identifiers for PRS resource 1 and PRS resource 2. The UE 115 will further provide report parameters associated with the subset of PRS resources, such as the a relative quality of the TOA measurement for each PRS resource in the subset, a spread of the TOA measurements for the subset of PRS resources, a relative RSRP for each PRS resource in the subset, a spread of the RSRP of each PRS resource in the subset, or a combination thereof.

Figure 10:
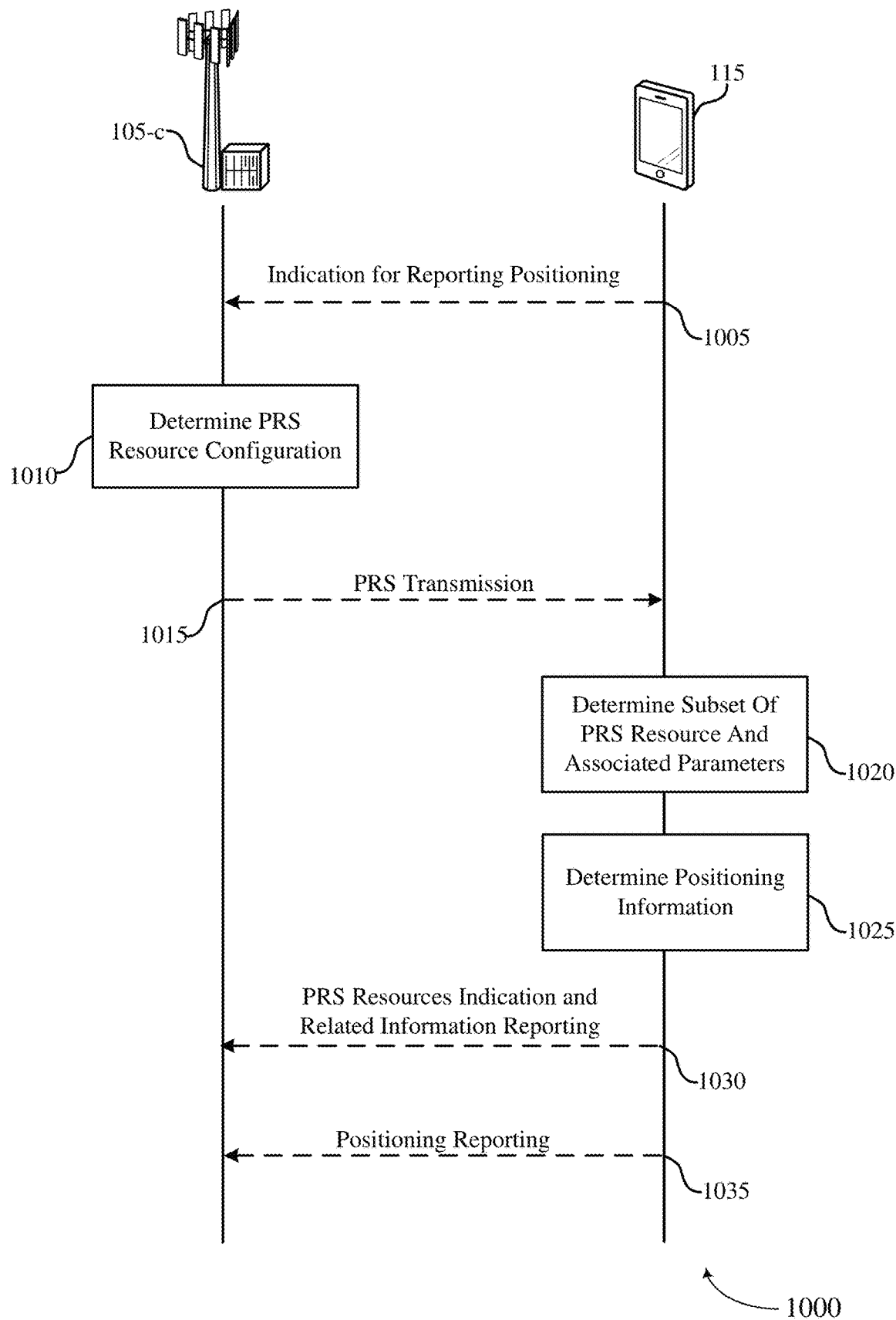
FIG. 10 illustrates a procedure that supports beam group reporting for positioning in NR systems in accordance with aspects of the present disclosure.

FIG. 10 illustrates an example of a process flow 1000 that supports beam group reporting for positioning in new radio in accordance with aspects of the present disclosure. The process flow 1000 may include operations by a UE 115 and a base station 105, which may be examples of the corresponding devices described with reference to FIG. 1. The base station 105 may correspond to a reference base station for the UE 115. The process flow 1000 may include aspects for beam group reporting associated with UE positioning and location information. Alternative examples of the following may be implemented, where some steps may be performed in a different order than described or not performed at all. In some implementations, steps may include additional features not mentioned below, or further steps may be added.

At 1005, the UE 115 may transmit an indication to the base station 105 that includes a capability for the UE 115 to report location and positioning information. The indication may correspond to an ability to use more than one PRS resource as reference (or target) PRS resources for RSTD determination and may be part of a UE-assisted positioning technique. For example, the indication may include an identification of parameters associated with the subset of PRS resources to be reported or an ability to use a predefined subset index.

At 1010, the base station 105 may receive the indication transmission from the UE 115. Based on the indication, the base station 105 may determine a configuration for performing PRS transmission. The PRS transmission may be associated with the base station 105 or one or more neighboring base stations that support communication with the UE 115. The configuration may correspond to a PRS resource sets that includes multiple PRS resources.

At 1015, the base station 105 may transmit the PRS transmission over one or more symbols of a configured slot and as part of a downlink reference signaling to the UE 115. The base station 105 may transmit the PRS resources of the PRS resource set as directional beams, as part of a beam swept transmission. For example, each PRS resource setting at the base station 105 may support multiple ports for transmitting the PRS transmission over a set of configured transmit beams.

At 1020, the UE 115 may receive the one or more PRS resources of the PRS transmission over PRBs of the slot. The UE 115 may assume the included PRS resources within each PRS resource set are associated with the same downlink spatial domain transmission filter and correspond to a single transmit beam at the base station 105. The UE 115 determines a subset of PRS resources from the PRS resource set to be used as the reference PRS resources in the RSTD measurement along with associated parameters for the subset of PRS resources. For example, the UE 115 may measure the TOA of each PRS resource and choose the subset of PRS resources. The UE 115 may further determine report parameters associated with the subset of PRS resources, such as a relative quality of the TOA measurement for each PRS resource in the subset, a spread of the TOA measurements for the subset of PRS resources, a relative RSRP for each PRS resource in the subset, a spread of the RSRP of each PRS resource in the subset, or a combination thereof.

At 1025, the UE 115 may determine positioning information, such as the combined reference TOA from the subset of PRS resources. The UE 115 may similarly determine a target TOA, which may be a combined target TOA from a subset of PRS resources, from a PRS resources transmission received from a target base station, not shown in FIG. 10. The UE 115 may determine the RSTD measurement using the combined reference TOA and target TOA, which may be combined target TOA.

At 1030, the UE 115 may transmit an indication of the subset of PRS resources and associated parameters determined at stage 1020.

At 1035, the UE 115 may transmit the positioning information determined at stage 1025. If desired, stages 1030 and 1035 may be combined in a single transmission.

The base station 105 may receive the indication of the subset of PRS resources and associated parameters and may send this to a location server, not shown. The base station 105 may similarly receive the positioning information and send to the location server.

Figure 11:
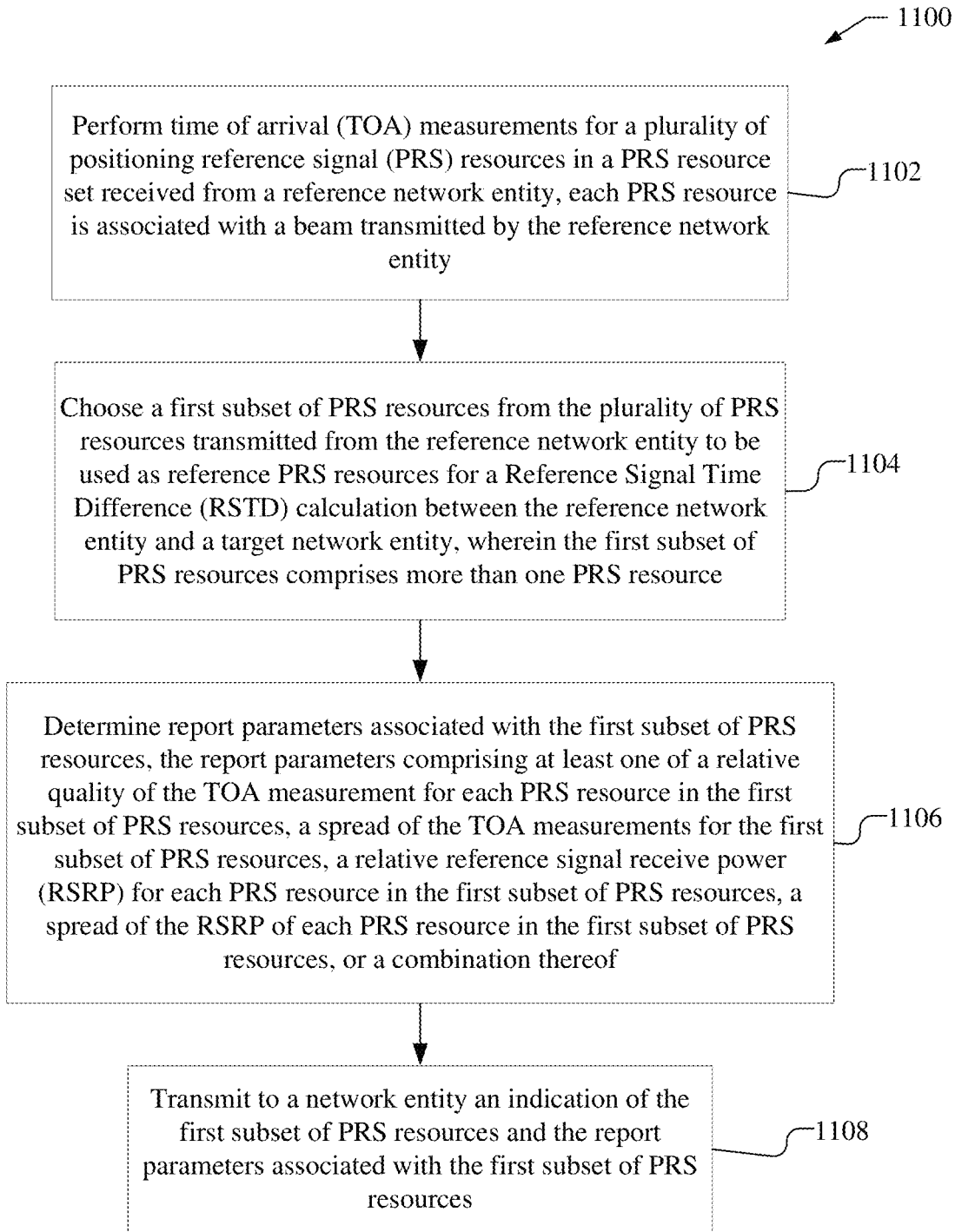
FIG. 11 shows a process flow illustrating a method that supports beam group reporting by a UE for positioning in NR systems in accordance with aspects of the present disclosure.

FIG. 11 shows a process flow 1100 illustrating a method that supports beam group reporting by a user equipment (UE), such as the UE 115, in accordance with aspects of the present disclosure. The operations of method 1100 may be implemented by a UE 115 or its components as described herein. In some examples, a UE may execute a set of instructions to control the functional elements of the UE to perform the functions described below. Additionally or alternatively, a UE may perform aspects of the functions described below using special-purpose hardware.

Process flow 1100 may start at block 1102, where the UE performs time of arrival (TOA) measurements for a plurality of positioning reference signal (PRS) resources in a PRS resource set received from a reference network entity, each PRS resource is associated with a beam transmitted by the reference network entity, e.g., as described with reference to FIGS. 7-10. At block 1104, the UE chooses a first subset of PRS resources from the plurality of PRS resources transmitted from the reference network entity to be used as reference PRS resources for a Reference Signal Time Difference (RSTD) calculation between the reference network entity and a target network entity, wherein the first subset of PRS resources comprises more than one PRS resource, e.g., as described with reference to FIGS. 7-10. At block 1106, the UE determines report parameters associated with the first subset of PRS resources, the report parameters comprising at least one of a relative quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof, e.g., as described with reference to FIGS. 7-10. At block 1108 the UE transmits to a network entity an indication of the first subset of PRS resources and the report parameters associated with the first subset of PRS resources, e.g., as described with reference to FIGS. 7-10.

In one implementation, the UE may additionally perform TOA measurements for a second plurality of PRS resources in a second PRS resource set received from the target network entity, each PRS resource is associated with a beam transmitted by the target network entity. The UE may choose a second subset of PRS resources from the second plurality of PRS resources to be used as target PRS resources for the RSTD calculation between the reference network entity and the target network entity, wherein the second subset of PRS resources comprise one or more PRS resources. The UE may determine report parameters associated with the second subset of PRS resources, the report parameters comprising at least one of a relative quality of the TOA measurement for each PRS resource in the second subset of PRS resources, a spread of the TOA measurements for the second subset of PRS resources, a relative RSRP for each PRS resource in the second subset of PRS resources, a spread of the RSRP of each PRS resource in the second subset of PRS resources, or a combination thereof. The UE may transmit to a network entity an indication of the second subset of PRS resources and the report parameters associated with the subset of PRS resources.

In one implementation, the indication of the first subset of PRS resources may be a PRS resource identifier (ID) for each PRS resource in the subset of PRS resources.

In one implementation, the indication of the first subset of PRS resources may be a number of PRS resources that are in the subset of PRS resources. For example, the indication of the first subset of PRS resources may be a field with N bits, where N is the number of PRS resources of the PRS resource set.

In one implementation, the UE may further receive from the network entity a plurality of subset indices, wherein each subset index identifies a different predefined subset of PRS resources in the PRS resource set, wherein the indication of the first subset of PRS resources may be a subset index identifying the predefined subset of PRS resources that includes one or more of the PRS resources in the subset of PRS resources. For example, the indication of the subset of PRS resources and the report parameters associated with the subset of PRS resources may be transmitted to the network entity in a Physical Uplink Shared Channel (PUSCH) or Physical Uplink Control Channel (PUCCH) as a physical layer payload.

In one implementation, the UE may further receive from the network entity a plurality of PRS resource sets containing multiple PRS resources that is configured with Repetition ON, wherein the indication of the first subset of PRS resources may be an identifier of the PRS resource set that includes the first subset of PRS resources.

In one implementation, the relative quality of the TOA measurement for each PRS resource in the first subset of PRS resources may be a comparison of an estimated uncertainty value of each PRS resource. The estimated uncertainty value of each PRS resource may be provided in time or distance units. The estimated uncertainty value of each PRS resource may be a weight used for a linear average of the TOA measurements produced using the first subset of PRS resources, wherein a sum of weights across all the PRS resources in the first subset of PRS resources is 1.

In one implementation, the spread of the TOA measurements for the subset of PRS resources may be a single value in time or distance units across all the PRS resources in the first subset of PRS resources. The spread of the TOA measurements for the subset of PRS resources may be based on the TOA measurement and the relative quality associated with each PRS resource in the first subset of PRS resources.

In one implementation, the relative RSRP for each PRS resource in the first subset of PRS resources may be a comparison of the RSRP for each PRS resource in the first subset of PRS resources relative to one PRS resource in the first subset of PRS resources.

In one implementation, the spread of the RSRP of each PRS resource in the first subset of PRS resources may be the RSRP across all the PRS resources in the first subset of PRS resources. In one example, the spread of the RSRP is the range of RSRPs across all the PRS resources in the subset of PRS resources.

Figure 12:
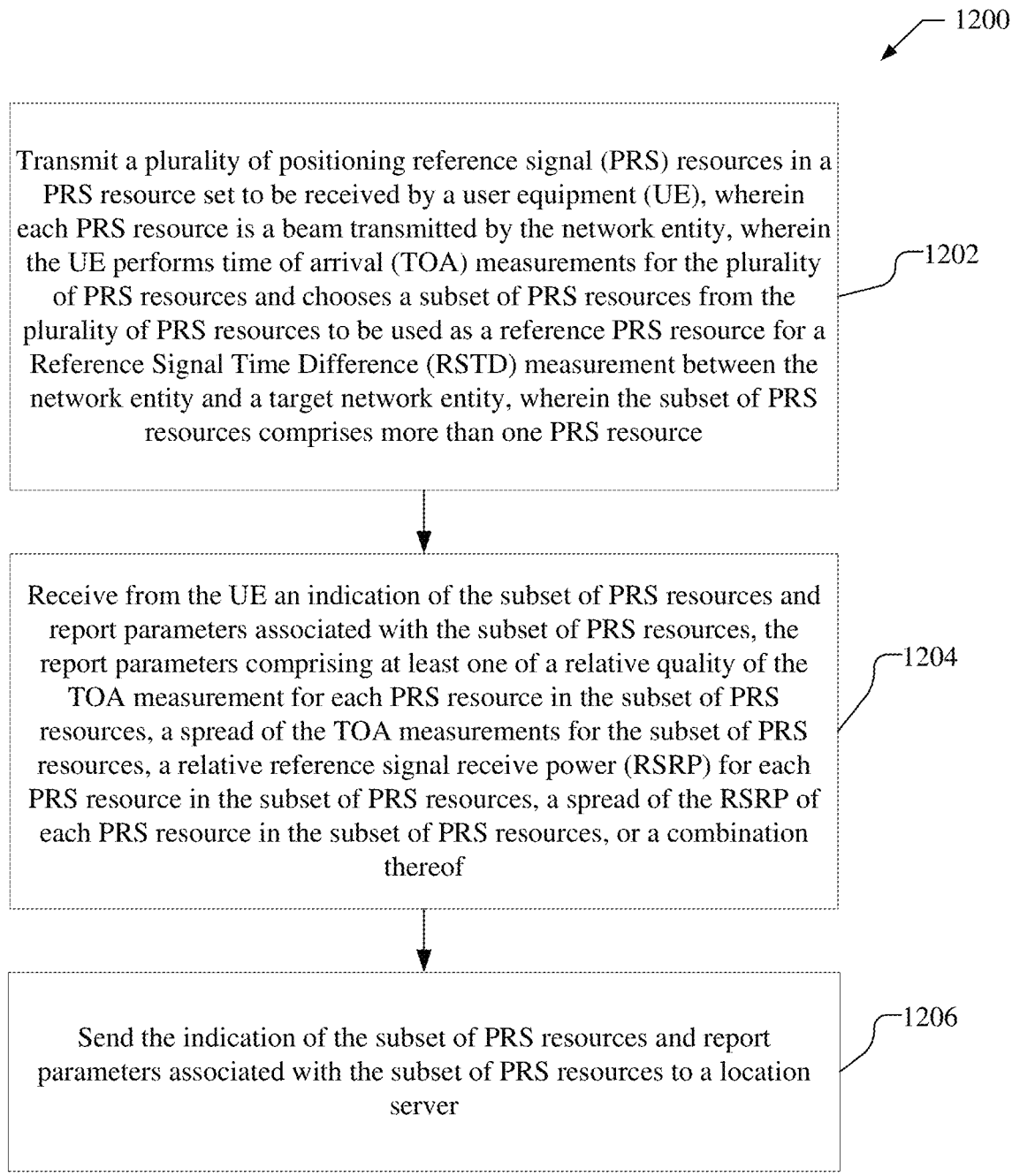
FIG. 12 shows a process flow illustrating a method that supports beam group reporting by a network entity for positioning in NR systems in accordance with aspects of the present disclosure.

FIG. 12 shows a process flow 1200 illustrating a method that supports beam group reporting by a network entity, such as the base station 105, in accordance with aspects of the present disclosure. The operations of method 1200 may be implemented by a base station 105 or its components as described herein. In some examples, a base station may execute a set of instructions to control the functional elements of the base station to perform the functions described below. Additionally or alternatively, a base station may perform aspects of the functions described below using special-purpose hardware.

Process flow 1200 may start at block 1202, where the base station transmits a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource, e.g., as described with reference to FIGS. 7-10. At block 1204, the base station receives from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof, e.g., as described with reference to FIGS. 7-10. At block 1206, the base station sends the indication of the subset of PRS resources and report parameters associated with the subset of PRS resources to a location server, e.g., as described with reference to FIGS. 7-10.

In one implementation, the base station may further transmit a second plurality of PRS resources in a second PRS resource set to be received by a second UE, wherein each PRS resource is a beam transmitted by the network entity, wherein the second UE performs TOA measurements for the second plurality of PRS resources and chooses a second subset of PRS resources from the second plurality of PRS resources to be used as a target PRS resource for a RSTD measurement between a reference network entity and the network entity, wherein the second subset of PRS resources comprises more than one PRS resource. The base station may receive from the second UE an indication of the second subset of PRS resources and report parameters associated with the second subset of PRS resources, the report parameters comprising at least one of a relative quality of the TOA measurement for each PRS resource in the second subset of PRS resources, a spread of the TOA measurements for the second subset of PRS resources, a relative RSRP for each PRS resource in the second subset of PRS resources, a spread of the RSRP of each PRS resource in the second subset of PRS resources, or a combination thereof. The base station sending the indication of the second subset of PRS resources and report parameters associated with the second subset of PRS resources to the location server.

In one implementation, the indication of the subset of PRS resources comprises a PRS resource identifier (ID) for each PRS resource in the subset of PRS resources.

In one implementation, the indication of the subset of PRS resources comprises a number of PRS resources that are in the subset of PRS resources. For example, the indication of the subset of PRS resources may be a field with N bits, where N is the number of PRS resources of the PRS resource set.

In one implementation, the base station may further transmit to the UE a plurality of subset indices, wherein each subset index identifies a different predefined subset of PRS resources in the PRS resource set, wherein the indication of the subset of PRS resources may be a subset index identifying the predefined subset of PRS resources that includes one or more of the PRS resources in the subset of PRS resources. For example, the indication of the subset of PRS resources and the report parameters associated with the subset of PRS resources may be received from the UE in a Physical Uplink Shared Channel (PUSCH) or Physical Uplink Control Channel (PUCCH) as a physical layer payload.

In one implementation, the base station may further transmit to the UE a plurality of PRS resource sets containing multiple PRS resources and that is configured with Repetition ON, wherein the indication of the subset of PRS resources may be an identifier of the PRS resource set that includes the subset of PRS resources.

In one implementation, the relative quality of the TOA measurement for each PRS resource in the subset of PRS resources may be a comparison of an estimated uncertainty value of each PRS resource. The estimated uncertainty value of each PRS resource may be provided in time or distance units. The estimated uncertainty value of each PRS resource may be a weight used for a linear average of the TOA measurements produced using the subset of PRS resources, wherein a sum of weights across all the PRS resources in the first subset of PRS resources is 1.

In one implementation, the spread of the TOA measurements for the subset of PRS resources may be a single value in time or distance units across all the PRS resources in the first subset of PRS resources. The spread of the TOA measurements for the subset of PRS resources may be based on the TOA measurement and the relative quality associated with each PRS resource in the first subset of PRS resources.

In one implementation, the relative RSRP for each PRS resource in the subset of PRS resources may be a comparison of the RSRP for each PRS resource in the first subset of PRS relative to one PRS resource in the subset of PRS resources.

In one implementation, the spread of the RSRP of each PRS resource in the subset of PRS resources may be the RSRP across all the PRS resources in the subset of PRS resources. In one example, the spread of the RSRP is the range of RSRPs across all the PRS resources in the subset of PRS resources.

Figure 13:
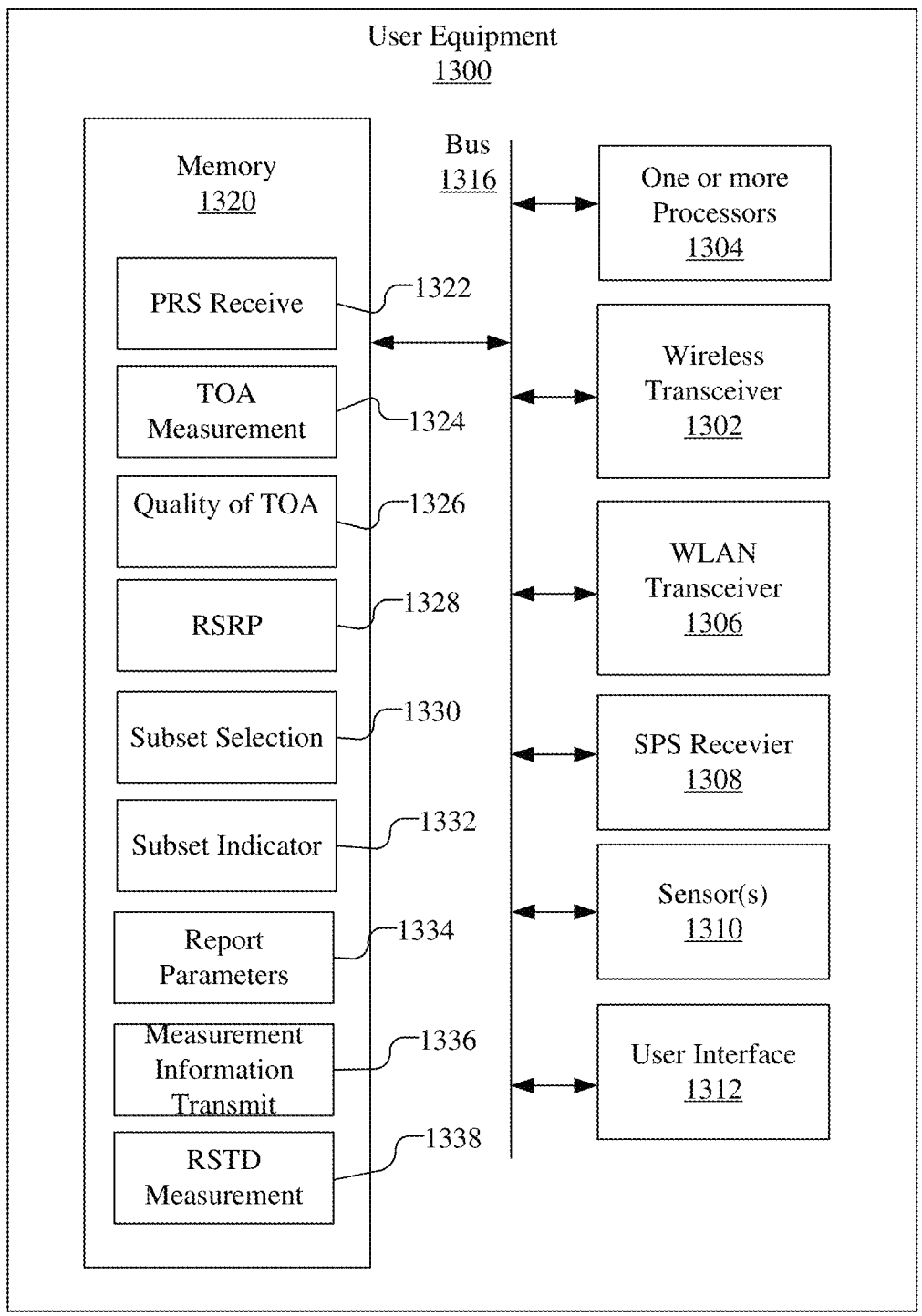
FIG. 13 is a block diagram of an embodiment of a UE capable of supporting beam group reporting for positioning in NR systems in accordance with aspects of the present disclosure.

FIG. 13 is a diagram illustrating an example of a hardware implementation of a user equipment (UE) 1300, such as UE 115. The UE 1300 may include a wireless transceiver 1302 to wirelessly communicate with a network entity, e.g., such as base station 105. The UE 1300 may also include additional transceivers, such a wireless local area network (WLAN) transceiver 1306, as well as an SPS receiver 1308 for receiving and measuring signals from SPS SVs. The UE 1300 may further include one or more sensors 1310, such as cameras, accelerometers, gyroscopes, electronic compass, magnetometer, barometer, etc. The UE 1300 may further include a user interface 1312 that may include e.g., a display, a keypad or other input device, such as virtual keypad on the display, through which a user may interface with the UE 1300. The UE 1300 further includes one or more processors 1304 and memory 1320, which may be coupled together with bus 1316. The one or more processors 1304 and other components of the UE 1300 may similarly be coupled together with bus 1316, a separate bus, or may be directly connected together or coupled using a combination of the foregoing. The memory 1320 may contain executable code or software instructions that when executed by the one or more processors 1304 cause the one or more processors to operate as a special purpose computer programmed to perform the algorithms disclosed herein.

As illustrated in FIG. 13, the memory 1320 may include one or more components or modules that may be implemented by the one or more processors 1304 to perform the methodologies described herein. While the components or modules are illustrated as software in memory 1320 that is executable by the one or more processors 1304, it should be understood that the components or modules may be dedicated hardware either in the one or more processors 1304 or off the processors.

As illustrated, the memory 1320 may include a PRS receive unit 1322 that configures the one or more processors 1304 to receive, via wireless transceiver 1302, a plurality of PRS resources in a PRS resource set from a network entity, each PRS resource is associated with a beam transmitted by the network entity. A TOA measurement unit 1324 configures the one or more processors 1304 to perform TOA measurements for the PRS resources received using PRS receive unit 1322. The TOA measurement unit 1324 may further configure the one or more processors 1304 to determine a combined TOA measurement using the PRS resources selected using subset selection unit 1330.

A quality of TOA unit 1326 configures the one or more processors 1304 to determine the quality of each TOA measurement, such as an estimated uncertainty of the PRS resource. A signal strength unit 1328 configures the one or more processors 1304 to determine the signal strength, e.g., the RSRP, of the received PRS resources. A subset selection unit 1330 configures the one or more processors 1304 to choose a subset of the PRS resources from the plurality of PRS resources received from the network entity to be used as PRS resources for a Reference Signal Time Difference (RSTD) calculation between the reference network entity and a target network entity. The subset of PRS resources may be more than one PRS resource. The selection of PRS resources may be based, e.g., the TOA measurements, as well as parameters such as the quality of the TOA measurements and RSRP of the PRS resources.

The memory 1320 may further include a subset indicator unit 1332 that configures the one or more processors 1304 to determine an indicator to identify the subset of PRS resources, e.g., as individual PRS resource identifiers, the number of PRS resources in the subset, or a predefined subset index, which may be received from the network entity, via the wireless transceiver 1302.

The memory 1320 may further include a report parameters unit 1334 that configures the one or more processors 1304 to determine report parameters associated with the subset of PRS resources. The report parameters, for example, may be a relative quality of the TOA measurement for each PRS resource in the subset, a spread of the TOA measurements for the subset of PRS resources, a relative RSRP for each PRS resource in the subset, a spread of the RSRP of each PRS resource in the subset, or a combination thereof.

A measurement information transmit unit 1336 may configure the one or more processors 1304 to report determined measurements, such as indication of the subset of PRS resources determined using subset indicator unit 1332 and the report parameters associated with the subset of PRS resources determined using report parameters unit 1334. The measurement information transmit unit 1336 may further transmit measurements such as the combined TOA determined using TOA measurement unit 1324 or an RSTD measurement determined using the RSTD measurement unit 1338. The RSTD measurement unit 1338 may configure the one or more processors 1304 to determine an RSTD measurement using reference TOA measurement and a target TOA measurement, one or both of which may be combined TOA measurements, as determined using the TOA measurement unit 1324.

The methodologies described herein may be implemented by various means depending upon the application. For example, these methodologies may be implemented in hardware, firmware, software, or any combination thereof. For a hardware implementation, the one or more processors 1304 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1300 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1320) and executed by one or more processors 1304, causing the one or more processors 1304 to operate as a special purpose computer programmed to perform the techniques disclosed herein. Memory may be implemented within the one or processors 1304 or external to the one or more processors 1304. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1300 may be stored as one or more instructions or code on a non-transitory computer-readable storage medium such as memory 1320. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1300 may be provided as signals on transmission media included in a communication apparatus. For example, a communication apparatus comprising part or all of UE 1300 may include a transceiver having signals indicative of instructions and data. The instructions and data are stored on non-transitory computer readable media, e.g., memory 1320, and are configured to cause the one or more processors 1304 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE, such as UE 1300, may be configured for wireless communication and may include a means for performing time of arrival (TOA) measurements for a plurality of positioning reference signal (PRS) resources in a PRS resource set received from a reference network entity, each PRS resource is associated with a beam transmitted by the reference network entity, which may be, e.g., the wireless transceiver 1302 and one or more processors 1304 with dedicated hardware for implementing executable code or software instructions in memory 1320 such as the PRS receive unit 1322 and the TOA measurement unit 1324. A means for choosing a first subset of PRS resources from the plurality of PRS resources transmitted from the reference network entity to be used as reference PRS resources for a Reference Signal Time Difference (RSTD) calculation between the reference network entity and a target network entity, wherein the first subset of PRS resources comprises more than one PRS resource may be, e.g., the one or more processors 1304 with dedicated hardware for implementing executable code or software instructions in memory 1320 such as the subset selection unit 1330. A means for determining report parameters associated with the first subset of PRS resources, the report parameters comprising at least one of a relative quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof may be, e.g., the one or more processors 1304 with dedicated hardware for implementing executable code or software instructions in memory 1320 such as the report parameters unit 1334. A means for transmitting to a network entity an indication of the first subset of PRS resources and the report parameters associated with the first subset of PRS resources may be, e.g., the wireless transceiver 1302 and one or more processors 1304 with dedicated hardware for implementing executable code or software instructions in memory 1320 such as the measurement information transmit unit 1336.

In one implementation, the UE may further include a means for performing TOA measurements for a second plurality of PRS resources in a second PRS resource set received from the target network entity, each PRS resource is associated with a beam transmitted by the target network entity, which may be, e.g., the wireless transceiver 1302 and one or more processors 1304 with dedicated hardware for implementing executable code or software instructions in memory 1320 such as the PRS receive unit 1322 and the TOA measurement unit 1324. A means for choosing a second subset of PRS resources from the second plurality of PRS resources to be used as target PRS resources for the RSTD calculation between the reference network entity and the target network entity, wherein the second subset of PRS resources comprise one or more PRS resources may be, e.g., the one or more processors 1304 with dedicated hardware for implementing executable code or software instructions in memory 1320 such as the subset selection unit 1330. A means for determining report parameters associated with the second subset of PRS resources, the report parameters comprising at least one of a relative quality of the TOA measurement for each PRS resource in the second subset of PRS resources, a spread of the TOA measurements for the second subset of PRS resources, a relative RSRP for each PRS resource in the second subset of PRS resources, a spread of the RSRP of each PRS resource in the second subset of PRS resources, or a combination thereof may be, e.g., the one or more processors 1304 with dedicated hardware for implementing executable code or software instructions in memory 1320 such as the report parameters unit 1334. A means for transmitting to a network entity an indication of the second subset of PRS resources and the report parameters associated with the subset of PRS resources may be, e.g., the wireless transceiver 1302 and one or more processors 1304 with dedicated hardware for implementing executable code or software instructions in memory 1320 such as the measurement information transmit unit 1336.

In one implementation, the UE may further include a means for receiving from the network entity a plurality of subset indices, wherein each subset index identifies a different predefined subset of PRS resources in the PRS resource set, which may be, e.g., the wireless transceiver 1302 and one or more processors 1304 with dedicated hardware for implementing executable code or software instructions in memory 1320 such as the PRS receive unit 1322. The indication of the first subset of PRS resources may comprise a subset index identifying the predefined subset of PRS resources that includes one or more of the PRS resources in the subset of PRS resources.

In one implementation, the UE may further include a means for receiving from the network entity a plurality of PRS resource sets containing multiple PRS resources that is configured with Repetition ON, which may be, e.g., the wireless transceiver 1302 and one or more processors 1304 with dedicated hardware for implementing executable code or software instructions in memory 1320 such as the PRS receive unit 1322. The indication of the first subset of PRS resources may be an identifier of the PRS resource set that includes the first subset of PRS resources.

Figure 14:
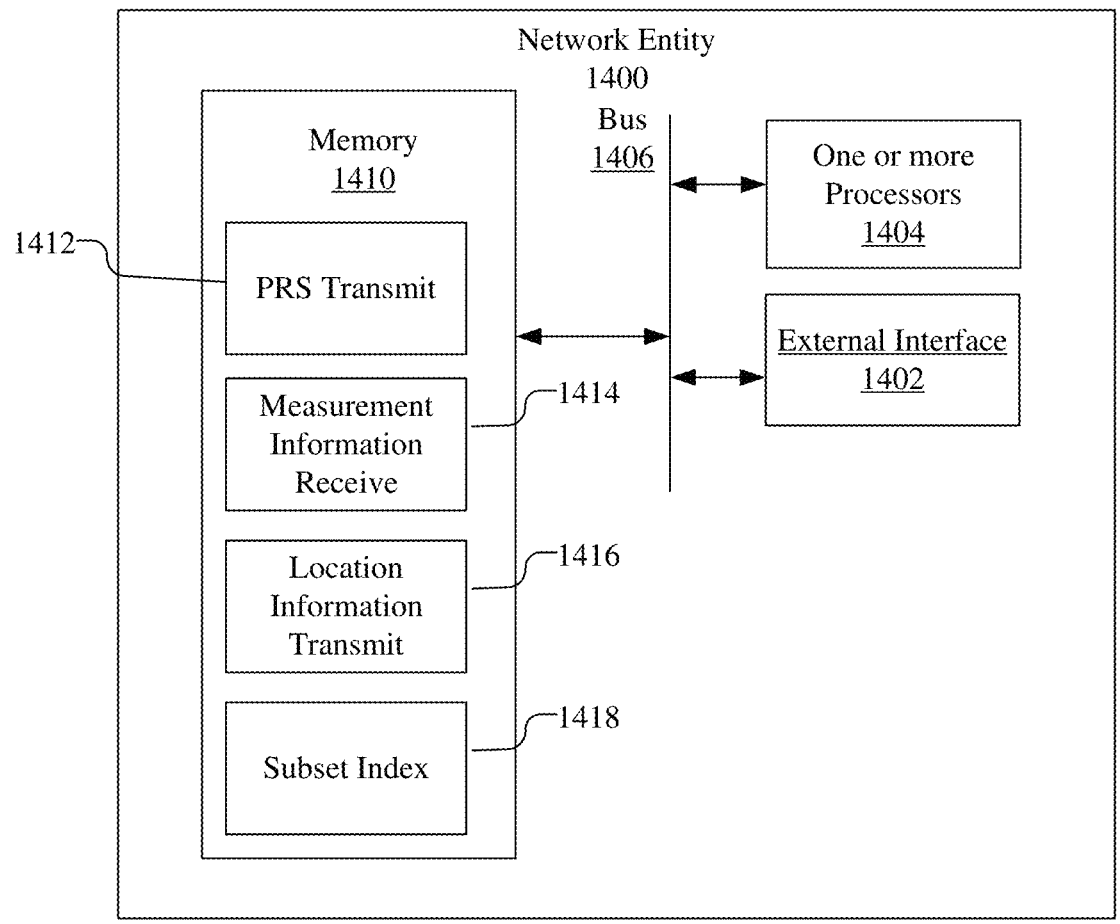
FIG. 14 is a block diagram of an embodiment of a network entity capable of supporting beam group reporting for positioning in NR systems in accordance with aspects of the present disclosure.

FIG. 14 is a diagram illustrating an example of a hardware implementation of a network entity 1400, such as base station 105. The network entity 1400 includes, e.g., hardware components such as an external interface 1402, which may be a wired and/or wireless interface capable of connecting to a location server, such as location server 101, and capable of wirelessly connecting to UE 115. The network entity 1400 includes a one or more processors 1404 and memory 1410, which may be coupled together with bus 1406. The memory 1410 may contain executable code or software instructions that when executed by the one or more processors 1404 cause the one or more processors 1404 to operate as a special purpose computer programmed to perform the procedures and techniques disclosed herein.

As illustrated in FIG. 14, the memory 1410 includes one or more components or modules that when implemented by the one or more processors 1404 implements the methodologies as described herein. While the components or modules are illustrated as software in memory 1410 that is executable by the one or more processors 1404, it should be understood that the components or modules may be dedicated hardware either in the processor or off processor.

As illustrated, the memory 1410 may include a PRS transmit unit 1412 that configures the one or more processors 1404 to transmit, via external interface 1402, a plurality of positioning reference signal (PRS) resources in a PRS resource set to be received by a UE, wherein each PRS resource is a transmitted beam. A measurement information receive unit 1414 configures the one or more processors 1404 to receive measurement information from the UE, such as an indication of a subset of PRS resources chosen by the UE to be used as a PRS resource for a Reference Signal Time Difference (RSTD) measurement and report parameters associated with the subset of PRS resources. The report parameters, for example, may be a relative quality of the TOA measurement for each PRS resource in the subset, a spread of the TOA measurements for the subset of PRS resources, a relative RSRP for each PRS resource in the subset, a spread of the RSRP of each PRS resource in the subset, or a combination thereof. A measurement information transmit unit 1416 configures the one or more processors 1404 to send to a location server, via the external interface 1402, the indication of the subset of PRS resources and report parameters associated with the subset of PRS resources.

The memory 1410 may further include a subset index unit 1418 that configures the one or more processors 1404 to maintain and to send to the UE, via the external interface 1402, plurality of subset indices, wherein each subset index identifies a different predefined subset of PRS resources in the PRS resource set.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1410, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a network entity, such as network entity 1400, may be configured for wireless communication and may include a means for transmitting a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource, which may be, e.g., the external interface 1402 and one or more processors 1404 with dedicated hardware for implementing executable code or software instructions in memory 1320 such as the PRS transmit unit 1412. A means for receiving from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof may be, e.g., the external interface 1402 and one or more processors 1404 with dedicated hardware for implementing executable code or software instructions in memory 1320 such as the measurement information receive unit 1414. A means for sending the indication of the subset of PRS resources and report parameters associated with the subset of PRS resources to a location server may be, e.g., the external interface 1402 and one or more processors 1404 with dedicated hardware for implementing executable code or software instructions in memory 1320 such as the measurement information transmit unit 1416.

In one implementation, the network entity may further include a means for transmitting a second plurality of PRS resources in a second PRS resource set to be received by a second UE, wherein each PRS resource is a beam transmitted by the network entity, wherein the second UE performs TOA measurements for the second plurality of PRS resources and chooses a second subset of PRS resources from the second plurality of PRS resources to be used as a target PRS resource for a RSTD measurement between a reference network entity and the network entity, wherein the second subset of PRS resources comprises more than one PRS resource, which may be, e.g., the external interface 1402 and one or more processors 1404 with dedicated hardware for implementing executable code or software instructions in memory 1320 such as the PRS transmit unit 1412. A means for receiving from the second UE an indication of the second subset of PRS resources and report parameters associated with the second subset of PRS resources, the report parameters comprising at least one of a relative quality of the TOA measurement for each PRS resource in the second subset of PRS resources, a spread of the TOA measurements for the second subset of PRS resources, a relative RSRP for each PRS resource in the second subset of PRS resources, a spread of the RSRP of each PRS resource in the second subset of PRS resources, or a combination thereof may be, e.g., the external interface 1402 and one or more processors 1404 with dedicated hardware for implementing executable code or software instructions in memory 1320 such as the measurement information receive unit 1414. A means for sending the indication of the second subset of PRS resources and report parameters associated with the second subset of PRS resources to the location server may be, e.g., the external interface 1402 and one or more processors 1404 with dedicated hardware for implementing executable code or software instructions in memory 1320 such as the measurement information transmit unit 1416.

In one implementation, the network entity may further include a means for transmitting to the UE a plurality of subset indices, wherein each subset index identifies a different predefined subset of PRS resources in the PRS resource set, which may be, e.g., the external interface 1402 and one or more processors 1404 with dedicated hardware for implementing executable code or software instructions in memory 1320 such as the subset index unit 1418. The indication of the subset of PRS resources may be a subset index identifying the predefined subset of PRS resources that includes one or more of the PRS resources in the subset of PRS resources.

In one implementation, the network entity may further include a means for transmitting to the UE a plurality of PRS resource sets containing multiple PRS resources and that is configured with Repetition ON, which may be, e.g., the external interface 1402 and one or more processors 1404 with dedicated hardware for implementing executable code or software instructions in memory 1320 such as the PRS transmit unit 1412. The indication of the subset of PRS resources may be an identifier of the PRS resource set that includes the subset of PRS resources.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In one implementation (1), a method for wireless communication performed by a network entity, comprising: transmitting a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; receiving from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and sending the indication of the subset of PRS resources and report parameters associated with the subset of PRS resources to a location server.

There may be some implementations (2) of the above-described method (1), further comprising: transmitting a second plurality of PRS resources in a second PRS resource set to be received by a second UE, wherein each PRS resource is a beam transmitted by the network entity, wherein the second UE performs TOA measurements for the second plurality of PRS resources and chooses a second subset of PRS resources from the second plurality of PRS resources to be used as a target PRS resource for a RSTD measurement between a reference network entity and the network entity, wherein the second subset of PRS resources comprises more than one PRS resource; and receiving from the second UE an indication of the second subset of PRS resources and report parameters associated with the second subset of PRS resources, the report parameters comprising at least one of a relative quality of the TOA measurement for each PRS resource in the second subset of PRS resources, a spread of the TOA measurements for the second subset of PRS resources, a relative RSRP for each PRS resource in the second subset of PRS resources, a spread of the RSRP of each PRS resource in the second subset of PRS resources, or a combination thereof; and sending the indication of the second subset of PRS resources and report parameters associated with the second subset of PRS resources to the location server.

There may be some implementations (3) of the above-described method (1), wherein the indication of the subset of PRS resources comprises a PRS resource identifier (ID) for each PRS resource in the subset of PRS resources.

There may be some implementations (4) of the above-described method (1), wherein the indication of the subset of PRS resources comprises a number of PRS resources that are in the subset of PRS resources.

There may be some implementations (5) of the above-described method (4), wherein the indication of the subset of PRS resources comprises a field with N bits, where N is the number of PRS resources of the PRS resource set.

There may be some implementations (6) of the above-described method (1), further comprising: transmitting to the UE a plurality of subset indices, wherein each subset index identifies a different predefined subset of PRS resources in the PRS resource set; wherein the indication of the subset of PRS resources comprises a subset index identifying the predefined subset of PRS resources that includes one or more of the PRS resources in the subset of PRS resources.

There may be some implementations (7) of the above-described method (6), wherein the indication of the subset of PRS resources and the report parameters associated with the subset of PRS resources is received from the UE in a Physical Uplink Shared Channel (PUSCH) or Physical Uplink Control Channel (PUCCH) as a physical layer payload.

There may be some implementations (8) of the above-described method (1), further comprising: transmitting to the UE a plurality of PRS resource sets containing multiple PRS resources and that is configured with Repetition ON; wherein the indication of the subset of PRS resources comprises an identifier of the PRS resource set that includes the subset of PRS resources.

There may be some implementations (9) of the above-described method (1), wherein the relative quality of the TOA measurement for each PRS resource in the subset of PRS resources comprises a comparison of an estimated uncertainty value of each PRS resource.

There may be some implementations (10) of the above-described method (9), wherein the estimated uncertainty value of each PRS resource is provided in time or distance units.

There may be some implementations (11) of the above-described method (9), wherein the estimated uncertainty value of each PRS resource is a weight used for a linear average of the TOA measurements produced using the subset of PRS resources, wherein a sum of weights across all the PRS resources in the first subset of PRS resources is 1.

There may be some implementations (12) of the above-described method (1), wherein the spread of the TOA measurements for the subset of PRS resources comprises a single value in time or distance units across all the PRS resources in the first subset of PRS resources.

There may be some implementations (13) of the above-described method (12), wherein the spread of the TOA measurements for the subset of PRS resources is based on the TOA measurement and the relative quality associated with each PRS resource in the first subset of PRS resources.

There may be some implementations (14) of the above-described method (1), wherein the relative RSRP for each PRS resource in the subset of PRS resources comprises a comparison of the RSRP for each PRS resource in the first subset of PRS relative to one PRS resource in the subset of PRS resources.

There may be some implementations (15) of the above-described method (1), wherein the spread of the RSRP of each PRS resource in the subset of PRS resources comprises the RSRP across all the PRS resources in the subset of PRS resources.

There may be some implementations (16) of the above-described method (1), wherein the spread of the RSRP of each PRS resource in the first subset of PRS resources comprises a range of RSRPs across all the PRS resources in the first subset of PRS resources.

In one implementation (17), a network entity configured for wireless communications, comprising: an external interface configured to communicate with a user equipment (UE) and a location server in a wireless network; at least one memory; and at least one processor coupled to the wireless transceiver and the at least one memory, the at least one processor configured to: transmit, via the external interface, a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; receive, via the external interface, from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and send, via the external interface, the indication of the subset of PRS resources and report parameters associated with the subset of PRS resources to a location server.

There may be some implementations (18) of the above-described network entity (17), wherein the at least one processor is further configured to: transmit, via the external interface, a second plurality of PRS resources in a second PRS resource set to be received by a second UE, wherein each PRS resource is a beam transmitted by the network entity, wherein the second UE performs TOA measurements for the second plurality of PRS resources and chooses a second subset of PRS resources from the second plurality of PRS resources to be used as a target PRS resource for a RSTD measurement between a reference network entity and the network entity, wherein the second subset of PRS resources comprises more than one PRS resource; and receive, via the external interface, from the second UE an indication of the second subset of PRS resources and report parameters associated with the second subset of PRS resources, the report parameters comprising at least one of a relative quality of the TOA measurement for each PRS resource in the second subset of PRS resources, a spread of the TOA measurements for the second subset of PRS resources, a relative RSRP for each PRS resource in the second subset of PRS resources, a spread of the RSRP of each PRS resource in the second subset of PRS resources, or a combination thereof; and send, via the external interface, the indication of the second subset of PRS resources and report parameters associated with the second subset of PRS resources to the location server.

There may be some implementations (19) of the above-described network entity (17), wherein the indication of the subset of PRS resources comprises a PRS resource identifier (ID) for each PRS resource in the subset of PRS resources.

There may be some implementations (20) of the above-described network entity (17), wherein the indication of the subset of PRS resources comprises a number of PRS resources that are in the subset of PRS resources.

There may be some implementations (21) of the above-described network entity (20), wherein the indication of the subset of PRS resources comprises a field with N bits, where N is the number of PRS resources of the PRS resource set.

There may be some implementations (22) of the above-described network entity (17), wherein the at least one processor is further configured to: transmit, via the external interface, to the UE a plurality of subset indices, wherein each subset index identifies a different predefined subset of PRS resources in the PRS resource set; wherein the indication of the subset of PRS resources comprises a subset index identifying the predefined subset of PRS resources that includes one or more of the PRS resources in the subset of PRS resources.

There may be some implementations (23) of the above-described network entity (22), wherein the indication of the subset of PRS resources and the report parameters associated with the subset of PRS resources is received from the UE in a Physical Uplink Shared Channel (PUSCH) or Physical Uplink Control Channel (PUCCH) as a physical layer payload.

There may be some implementations (24) of the above-described network entity (17), wherein the at least one processor is further configured to: transmit, via the external interface, to the UE a plurality of PRS resource sets containing multiple PRS resources and that is configured with Repetition ON; wherein the indication of the subset of PRS resources comprises an identifier of the PRS resource set that includes the subset of PRS resources.

There may be some implementations (25) of the above-described network entity (17), wherein the relative quality of the TOA measurement for each PRS resource in the subset of PRS resources comprises a comparison of an estimated uncertainty value of each PRS resource.

There may be some implementations (26) of the above-described network entity (25), wherein the estimated uncertainty value of each PRS resource is provided in time or distance units.

There may be some implementations (27) of the above-described network entity (25), wherein the estimated uncertainty value of each PRS resource is a weight used for a linear average of the TOA measurements produced using the subset of PRS resources, wherein a sum of weights across all the PRS resources in the first subset of PRS resources is 1.

There may be some implementations (28) of the above-described network entity (17), wherein the spread of the TOA measurements for the subset of PRS resources comprises a single value in time or distance units across all the PRS resources in the first subset of PRS resources.

There may be some implementations (29) of the above-described network entity (28), wherein the spread of the TOA measurements for the subset of PRS resources is based on the TOA measurement and the relative quality associated with each PRS resource in the first subset of PRS resources.

There may be some implementations (30) of the above-described network entity (17), wherein the relative RSRP for each PRS resource in the subset of PRS resources comprises a comparison of the RSRP for each PRS resource in the first subset of PRS relative to one PRS resource in the subset of PRS resources.

There may be some implementations (31) of the above-described network entity (17), wherein the spread of the RSRP of each PRS resource in the subset of PRS resources comprises the RSRP across all the PRS resources in the subset of PRS resources.

There may be some implementations (32) of the above-described network entity (17), wherein the spread of the RSRP of each PRS resource in the first subset of PRS resources comprises a range of RSRPs across all the PRS resources in the first subset of PRS resources.

In one implementation (33), a network entity configured for wireless communications, comprising: means for transmitting a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; means for receiving from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and means for sending the indication of the subset of PRS resources and report parameters associated with the subset of PRS resources to a location server.

In one implementation (34, a non-transitory computer readable medium comprising instructions, which when executed by one or more processors of a network entity configured for wireless communications, configures the network entity to: transmit a plurality of positioning reference signal (PRS) resources in a PRS resource set to be received by a user equipment (UE), wherein each PRS resource is a beam transmitted by the network entity, wherein the UE performs time of arrival (TOA) measurements for the plurality of PRS resources and chooses a subset of PRS resources from the plurality of PRS resources to be used as a reference PRS resource for a Reference Signal Time Difference (RSTD) measurement between the network entity and a target network entity, wherein the subset of PRS resources comprises more than one PRS resource; receive from the UE an indication of the subset of PRS resources and report parameters associated with the subset of PRS resources, the report parameters comprising at least one of a relative quality of the TOA measurement for each PRS resource in the subset of PRS resources, a spread of the TOA measurements for the subset of PRS resources, a relative reference signal receive power (RSRP) for each PRS resource in the subset of PRS resources, a spread of the RSRP of each PRS resource in the subset of PRS resources, or a combination thereof; and send the indication of the subset of PRS resources and report parameters associated with the subset of PRS resources to a location server.

Therefore, it is intended that claimed subject matter not be limited to the particular examples disclosed, but that such claimed subject matter may also include all aspects falling within the scope of appended claims, and equivalents thereof.

What is claimed is:

1. A method for wireless communication at a user equipment (UE), comprising:
performing time of arrival (TOA) measurements for a plurality of positioning reference signal (PRS) resources in a PRS resource set received from a reference network entity;
selecting a first subset of PRS resources from the plurality of PRS resources transmitted from the reference network entity to be used for a Reference Signal Time Difference (RSTD) calculation between the reference network entity and a target network entity, wherein the first subset of PRS resources comprises more than one PRS resource;

determining report parameters associated with the first subset of PRS resources, the report parameters comprising at least one of a quality of a TOA measurement for each PRS resource in the first subset of PRS resources, a spread of TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and transmitting to a network entity an at least one identifier associated with the first subset of PRS resources and the report parameters associated with the first subset of PRS resources.

2. The method of claim 1, further comprising:

performing TOA measurements for a second plurality of PRS resources in a second PRS resource set received from the target network entity;

selecting a second subset of PRS resources from the second plurality of PRS resources to be used as target PRS resources for the RSTD calculation between the reference network entity and the target network entity, wherein the second subset of PRS resources comprise one or more PRS resources;

determining report parameters associated with the second subset of PRS resources, the report parameters comprising at least one of a quality of a TOA measurement for each PRS resource in the second subset of PRS resources, a spread of TOA measurements for the second subset of PRS resources, a relative RSRP for each PRS resource in the second subset of PRS resources, a spread of the RSRP of each PRS resource in the second subset of PRS resources, or a combination thereof; and transmitting to the network entity an at least one identifier associated with the second subset of PRS resources and the report parameters associated with the second subset of PRS resources.

3. The method of claim 1, wherein the at least one identifier associated with the first subset of PRS resources comprises one of: a PRS resource identifier (ID) for each PRS resource in the first subset of PRS resources or an identifier for the PRS resource set.

4. The method of claim 1, further comprising:

receiving from the network entity a plurality of subset indices, wherein each subset index identifies a different predefined subset of PRS resources in the PRS resource set;

wherein the at least one identifier associated with the first subset of PRS resources comprises a subset index identifying a predefined subset of PRS resources that includes one or more of the PRS resources in the first subset of PRS resources.

5. The method of claim 4, wherein the at least one identifier associated with the first subset of PRS resources and the report parameters associated with the first subset of PRS resources is transmitted to the network entity in a Physical Uplink Shared Channel (PUSCH) or Physical Uplink Control Channel (PUCCH) as a physical layer payload.

6. The method of claim 1, further comprising:

receiving from the network entity a plurality of PRS resource sets containing multiple PRS resources that is configured with Repetition ON;

wherein the at least one identifier associated with the first subset of PRS resources comprises an identifier of the PRS resource set that includes the first subset of PRS resources.

7. The method of claim 1, wherein the quality of the TOA measurement for each PRS resource in the first subset of PRS resources comprises a comparison of an estimated uncertainty value of each PRS resource.

8. The method of claim 7, wherein the estimated uncertainty value of each PRS resource is provided in time or distance units.

9. The method of claim 7, wherein the estimated uncertainty value of each PRS resource is a weight used for a linear average of the TOA measurements produced using the first subset of PRS resources, wherein a sum of weights across all the PRS resources in the first subset of PRS resources is 1.

10. The method of claim 1, wherein the spread of the TOA measurements for the first subset of PRS resources comprises a single value in time or distance units across all the PRS resources in the first subset of PRS resources.

11. The method of claim 10, wherein the spread of the TOA measurements for the first subset of PRS resources is based on the TOA measurement and the quality associated with each PRS resource in the first subset of PRS resources.

12. The method of claim 1, wherein the relative RSRP for each PRS resource in the first subset of PRS resources comprises a comparison of the RSRP for each PRS resource in the first subset of PRS resources relative to one PRS resource in the first subset of PRS resources.

13. The method of claim 1, wherein the spread of the RSRP of each PRS resource in the first subset of PRS resources comprises the RSRP across all the PRS resources in the first subset of PRS resources.

14. The method of claim 1, wherein the spread of the RSRP of each PRS resource in the first subset of PRS resources comprises a range of RSRPs across all the PRS resources in the first subset of PRS resources.

15. A user equipment (UE) configured for wireless communications, comprising:

a wireless transceiver configured to communicate with base stations in a wireless network;

at least one memory; and at least one processor coupled to the wireless transceiver and the at least one memory, the at least one processor configured to:

perform time of arrival (TOA) measurements for a plurality of positioning reference signal (PRS) resources in a PRS resource set received from a reference network entity via the wireless transceiver;

select a first subset of PRS resources from the plurality of PRS resources transmitted from the reference network entity to be used for a Reference Signal Time Difference (RSTD) calculation between the reference network entity and a target network entity, wherein the first subset of PRS resources comprises more than one PRS resource;

determine report parameters associated with the first subset of PRS resources, the report parameters comprising at least one of a quality of a TOA measurement for each PRS resource in the first subset of PRS resources, a spread of TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and transmit to a network entity, via the wireless transceiver, an at least one identifier associated with the first subset of PRS resources and the report parameters associated with the first subset of PRS resources.

16. The UE of claim 15, wherein the at least one processor is further configured to:
perform TOA measurements for a second plurality of PRS resources in a second PRS resource set received from the target network entity;
select a second subset of PRS resources from the second plurality of PRS resources to be used as target PRS resources for the RSTD calculation between the reference network entity and the target network entity, wherein the second subset of PRS resources comprise one or more PRS resources;
determine report parameters associated with the second subset of PRS resources, the report parameters comprising at least one of a quality of a TOA measurement for each PRS resource in the second subset of PRS resources, a spread of TOA measurements for the second subset of PRS resources, a relative RSRP for each PRS resource in the second subset of PRS resources, a spread of the RSRP of each PRS resource in the second subset of PRS resources, or a combination thereof; and
transmit to the network entity, via the wireless transceiver, an at least one identifier associated with the second subset of PRS resources and the report parameters associated with the second subset of PRS resources.

17. The UE of claim 15, wherein the at least one identifier associated with the first subset of PRS resources comprises one of: a PRS resource identifier (ID) for each PRS resource in the first subset of PRS resources or an identifier for the PRS resource set.

18. The UE of claim 15, wherein the at least one processor is further configured to:
receive from the network entity, via the wireless transceiver, a plurality of subset indices, wherein each subset index identifies a different predefined subset of PRS resources in the PRS resource set;
wherein the at least one identifier associated with the first subset of PRS resources comprises a subset index identifying a predefined subset of PRS resources that includes one or more of the PRS resources in the first subset of PRS resources.

19. The UE of claim 18, wherein the at least one identifier associated with the first subset of PRS resources and the report parameters associated with the first subset of PRS resources is transmitted to the network entity in a Physical Uplink Shared Channel (PUSCH) or Physical Uplink Control Channel (PUCCH) as a physical layer payload.

20. The UE of claim 15, wherein the at least one processor is further configured to:
receive from the network entity, via the wireless transceiver, a plurality of PRS resource sets containing multiple PRS resources that is configured with Repetition ON;
wherein the at least one identifier associated with the first subset of PRS resources comprises an identifier of the PRS resource set that includes the first subset of PRS resources.

21. The UE of claim 15, wherein the quality of the TOA measurement for each PRS resource in the first subset of PRS resources comprises a comparison of an estimated uncertainty value of each PRS resource.

22. The UE of claim 21, wherein the estimated uncertainty value of each PRS resource is provided in time or distance units.

23. The UE of claim 21, wherein the estimated uncertainty value of each PRS resource is a weight used for a linear average of the TOA measurements produced using the first subset of PRS resources, wherein a sum of weights across all the PRS resources in the first subset of PRS resources is 1.

24. The UE of claim 15, wherein the spread of the TOA measurements for the first subset of PRS resources comprises a single value in time or distance units across all the PRS resources in the first subset of PRS resources.

25. The UE of claim 24, wherein the spread of the TOA measurements for the first subset of PRS resources is based on the TOA measurement and the quality associated with each PRS resource in the first subset of PRS resources.

26. The UE of claim 15, wherein the relative RSRP for each PRS resource in the first subset of PRS resources comprises a comparison of the RSRP for each PRS resource in the first subset of PRS resources relative to one PRS resource in the first subset of PRS resources.

27. The UE of claim 15, wherein the spread of the RSRP of each PRS resource in the first subset of PRS resources comprises the RSRP across all the PRS resources in the first subset of PRS resources.

28. The UE of claim 15, wherein the spread of the RSRP of each PRS resource in the first subset of PRS resources comprises a range of RSRPs across all the PRS resources in the first subset of PRS resources.

29. A user equipment (UE) configured for wireless communications, comprising:
means for performing time of arrival (TOA) measurements for a plurality of positioning reference signal (PRS) resources in a PRS resource set received from a reference network entity;
means for selecting a first subset of PRS resources from the plurality of PRS resources transmitted from the reference network entity to be used for a Reference Signal Time Difference (RSTD) calculation between the reference network entity and a target network entity, wherein the first subset of PRS resources comprises more than one PRS resource;
means for determining report parameters associated with the first subset of PRS resources, the report parameters comprising at least one of a quality of a TOA measurement for each PRS resource in the first subset of PRS resources, a spread of TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and
means for transmitting to a network entity an at least one identifier associated with the first subset of PRS resources and the report parameters associated with the first subset of PRS resources.

30. A non-transitory computer readable medium comprising instructions, which when executed by one or more processors of a user equipment (UE) configured for wireless communications, configures the UE to:
perform time of arrival (TOA) measurements for a plurality of positioning reference signal (PRS) resources in a PRS resource set received from a reference network entity;
select a first subset of PRS resources from the plurality of PRS resources transmitted from the reference network entity to be used as for a Reference Signal Time Difference (RSTD) calculation between the reference network entity and a target network entity, wherein the first subset of PRS resources comprises more than one PRS resource;

determine report parameters associated with the first subset of PRS resources, the report parameters comprising at least one of a quality of the TOA measurement for each PRS resource in the first subset of PRS resources, a spread of the TOA measurements for the first subset of PRS resources, a relative reference signal receive power (RSRP) for each PRS resource in the first subset of PRS resources, a spread of the RSRP of each PRS resource in the first subset of PRS resources, or a combination thereof; and transmit to a network entity an at least one identifier associated with the first subset of PRS resources and the report parameters associated with the first subset of PRS resources.

* * * * *